United States Patent
Dudha et al.

(10) Patent No.: US 10,430,539 B1
(45) Date of Patent: Oct. 1, 2019

(54) METHOD AND APPARATUS FOR ENHANCING PERFORMANCE BY MOVING OR ADDING A PIPELINED REGISTER STAGE IN A CASCADED CHAIN

(71) Applicant: Xilinx, Inc., San Jose, CA (US)

(72) Inventors: Chaithanya Dudha, San Jose, CA (US); Zhao Ma, San Jose, CA (US); Krishna Garlapati, Los Gatos, CA (US); Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 192 days.

(21) Appl. No.: 15/382,439

(22) Filed: Dec. 16, 2016

(51) Int. Cl.
*G06F 17/50* (2006.01)

(52) U.S. Cl.
CPC ........ *G06F 17/505* (2013.01); *G06F 17/5072* (2013.01); *G06F 17/5081* (2013.01)

(58) Field of Classification Search
CPC . G06F 17/505; G06F 17/5081; G06F 17/5072
See application file for complete search history.

(56) References Cited

U.S. PATENT DOCUMENTS

| | | | |
|---|---|---|---|
| 6,760,899 B1 | 7/2004 | Young et al. | |
| 6,766,504 B1 | 7/2004 | Rahut et al. | |
| 7,072,815 B1 | 7/2006 | Chaudhary et al. | |
| 7,137,090 B1 | 11/2006 | Manaker, Jr. et al. | |
| 7,143,378 B1 | 11/2006 | Nag | |
| 8,479,133 B2 * | 7/2013 | Wendling | G06F 7/575 716/116 |
| 9,275,184 B1 * | 3/2016 | Chiu | G06F 17/505 |
| 9,438,203 B1 * | 9/2016 | Mauer | H03H 17/0248 |
| 2002/0152250 A1 * | 10/2002 | Staszewski | G11B 20/10 708/319 |
| 2004/0225970 A1 * | 11/2004 | Oktem | G06F 17/505 716/114 |
| 2008/0072198 A1 * | 3/2008 | Celik | G06F 17/5031 716/108 |
| 2010/0191786 A1 * | 7/2010 | Simkins | G06F 7/5443 708/209 |
| 2011/0307688 A1 * | 12/2011 | Nurvitadhi | G06F 17/5045 712/219 |
| 2013/0290919 A1 * | 10/2013 | Narayanaswamy | G06F 17/5009 716/106 |
| 2016/0342422 A1 * | 11/2016 | Langhammer | G06F 9/3012 |
| 2016/0344373 A1 * | 11/2016 | Langhammer | H03H 17/06 |
| 2017/0248989 A1 * | 8/2017 | Vrudhula | G06F 1/12 |

OTHER PUBLICATIONS

"Implementing High-Order FIR Filters in FPGAs", by Phillip Fodisch, Artsiom Bryksa, Bert Lange, Wolfgang Enghardt, and Peter Kaever, Oct. 2016.*

* cited by examiner

*Primary Examiner* — Nha T Nguyen
(74) *Attorney, Agent, or Firm* — W. Eric Webostad; Robert M. Brush

(57) ABSTRACT

Methods and apparatus relating generally to synthesis are described. In such a method, a directed graph for a circuit design is generated. A cascaded chain is identified in the directed graph with a timing violation. A pipeline register stage of the cascaded chain is moved (or added) to remove the timing violation. The circuit design is transformed to provide a netlist including the pipeline register stage.

20 Claims, 18 Drawing Sheets

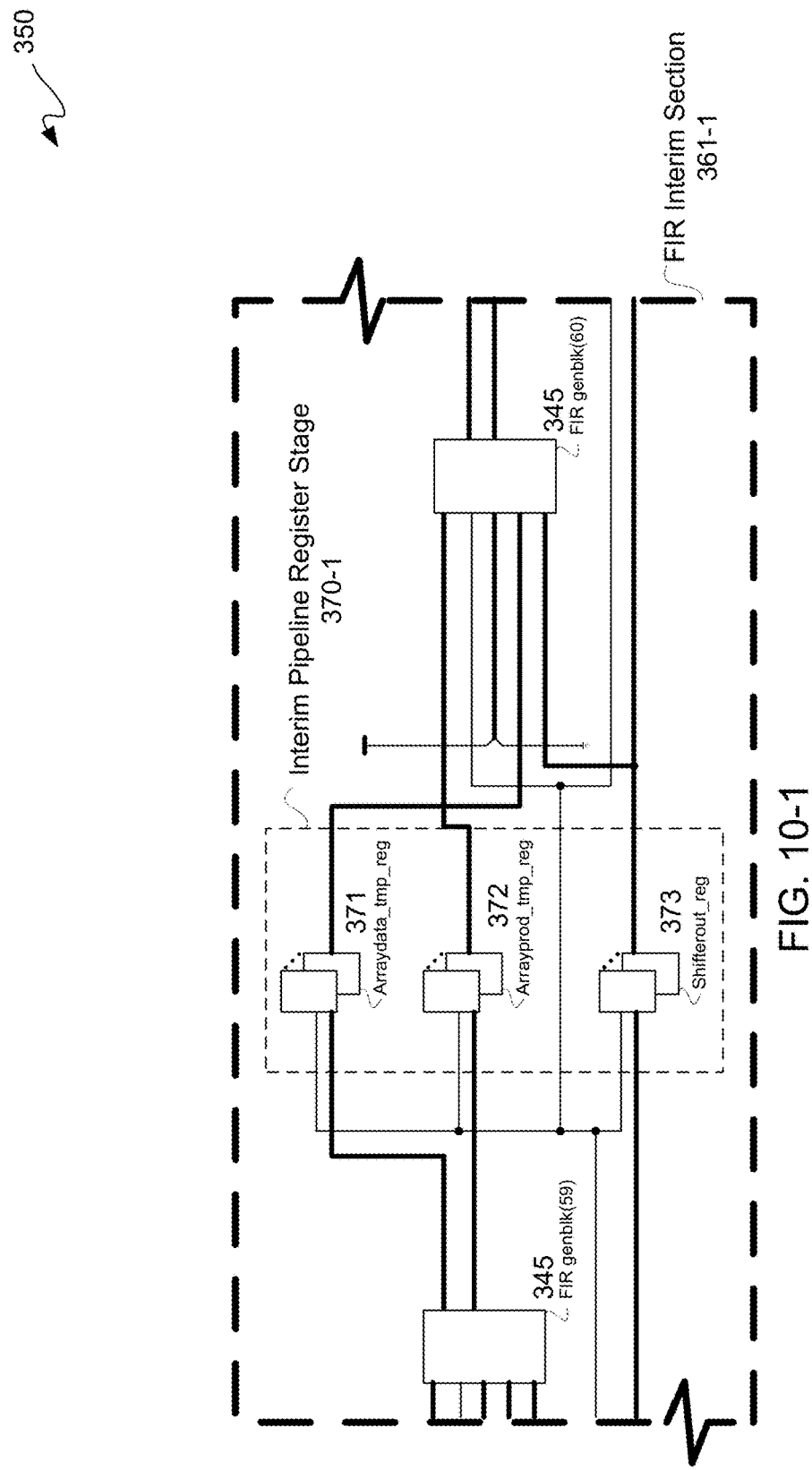

METHOD AND APPARATUS FOR ENHANCING PERFORMANCE BY MOVING OR ADDING A PIPELINED REGISTER STAGE IN A CASCADED CHAIN

FIELD OF THE INVENTION

The following description relates to integrated circuit devices ("ICs"). More particularly, the following description relates to enhancing performance by moving or adding a pipelined register stage in a cascaded chain for an IC.

BACKGROUND

Integrated circuits have become more "dense" over time, i.e., more logic features have been implemented in an IC of a given size. Moreover, performance of ICs has increased. Along those lines, long filter chains with high performance demands are becoming more commonplace in ICs. The length of these changes and the performance parameters associated therewith can make placement, as well as associated routing, of such cascaded chains more problematic.

SUMMARY

A method relates generally to synthesis. In such a method, a directed graph for a circuit design is generated. A cascaded chain is identified in the directed graph with a timing violation. A pipeline register stage of the cascaded chain is moved to remove the timing violation. The circuit design is transformed to provide a netlist including the pipeline register stage.

Another method relates generally to synthesis. In such a method, a directed graph for a circuit design is generated. A cascaded chain is identified in the directed graph with a timing violation. A pipeline register stage is added to the cascaded chain to remove the timing violation. The circuit design is transformed to provide a netlist including the pipeline register stage.

A computer aided design program product generally relates to synthesis. In this computer aided design program product, there is a tangible computer-readable storage medium and a computer-readable program stored on the tangible computer-readable storage medium. The computer-readable program is capable of being processed by an information handling system for causing the information handling system to perform operations. The operations include: generating a directed graph for a circuit design; identifying a cascaded chain in the directed graph with a timing violation; moving a pipeline register stage of the cascaded chain to remove the timing violation; and transforming the circuit design to provide a netlist including the pipeline register stage.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a flow diagram illustratively depicting another exemplary placement of resources flow.

FIG. 2 is a flow diagram illustratively depicting an exemplary design synthesis flow for a synthesizing operation.

FIGS. 8-1 through 8-3 is a schematic diagram illustratively depicting an exemplary conventional cascaded chain forming finite impulse response ("FIR") filter design ("FIR design").

FIGS. 9-1 and 9-2 is a schematic diagram illustratively depicting an exemplary FIR interim section and an exemplary output section respectively of FIGS. 8-2 and 8-3 after moving of a single register transfer level ("RTL") pipeline register stage to provide a reconfigured cascaded chain.

FIGS. 10-1 through 10-3 is a schematic diagram illustratively depicting two exemplary FIR interim sections and FIR output section after moving of two RTL pipeline register stages of FIG. 8-3.

FIG. 11-1 is a schematic diagram illustratively depicting an exemplary conventional transposed FIR filter.

FIG. 11-2 is a schematic diagram illustratively depicting an exemplary transposed FIR filter after moving an output RTL pipeline register stage of the FIR filter of FIG. 11-1.

FIG. 12-1 is a schematic diagram illustratively depicting an exemplary conventional systolic FIR filter.

FIG. 12-2 is a schematic diagram illustratively depicting an exemplary systolic FIR filter after moving an output RTL pipeline register stage of the FIR filter of FIG. 12-1.

DETAILED DESCRIPTION

Figure 1:
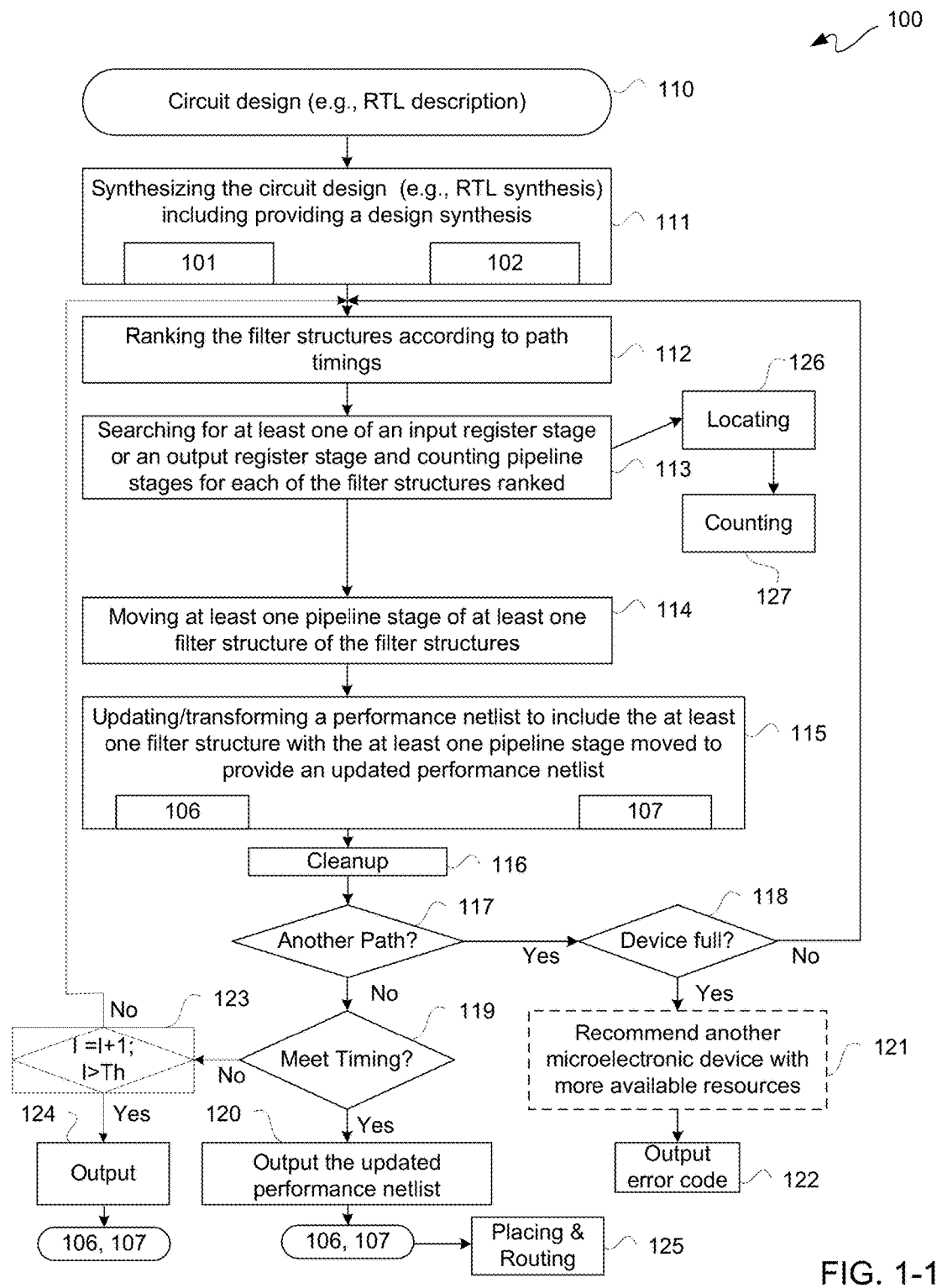
FIG. 1-1 is a flow diagram illustratively depicting an exemplary placement of resources flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Computer synthesis of a circuit design may be used to identify circuit structures within such a circuit design. In the past, "knobs" were used to have place and route routines exhaustively explore a solution space to obtain an optimal result.

As described below in additional detail, filter structures with length beyond a threshold, as well as associated pipeline register stages, may be identified during computer synthesis of a circuit design. Along those lines, cascaded chains associated with such filter structures or cascaded chains associated with other types of circuit structures which may be pipelined may be broken up into two or more sections. Because such sections are shorter than a full length chain, place and route flexibility is enhanced for obtaining a suitable implementation of an updated netlist obtained from such synthesis. Moreover, such flexibility may lead to more deterministic results and runtimes. For example, as described below in additional detail, place and route may run with default behavior to produce a predictable result, and place and route may run without a user having to make any changes to a circuit design in instances where a register pipeline stage may be moved to meet timing parameters.

With the above general understanding borne in mind, various configurations for computer aided design for synthesis of a circuit design is generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a flow diagram illustratively depicting an exemplary placement of resources flow 100. Placement of resources flow 100 may be part of a computer aided design software tool or other software tool. Placement of resources flow 100 may include operations, generally indicated as operations 111 through 127.

A representation of a circuit design ("circuit design") 110 may be obtained for input to a synthesizer for synthesis at 111. A circuit design 110 may be synthesized to generate a netlist 101, including without limitation a performance netlist, for such a circuit design. For purposes of clarity by way of example and not limitation, it shall be assumed that such a circuit design 110 is synthesized to provide a "performance" netlist 101 associated logic and other circuitry including timing, data, and other parameters for operation of a realization of circuit design 110. Moreover, for purposes of clarity by way of example and not limitation, it shall be assumed that such circuit design 110 includes using a register-transfer-level ("RTL") description of a circuit design therefor in a hardware description language ("HDL"), such as Verilog or VHDL.

At 111, such a circuit design 110 may be input into a synthesizer for converting an RTL abstraction of such circuit design 110 into a lower-level logic representation as a performance netlist 101. A synthesizer may be implemented as a computer or a network of computers programmed with one or more electronic design automation ("EDA") software tools. More particularly, for this example implementation, synthesis at 111 includes a logic synthesis, namely conversion of an RTL circuit design description in an HDL into a performance netlist 101, and a design synthesis, namely generating a directed graph 102 for circuit design 110 synthesized. Such a performance netlist 101 may optionally be provided as a bitstream for instantiating a realization of such a circuit design 110 in a microelectronic device having programmatically configurable circuitry, such a field programmable array in an FPGA or other IC having field programmable circuitry for programming responsive to a configuration bitstream for realizing a circuit design in circuitry fabric of such field programmable circuitry.

Figures 1, 2:
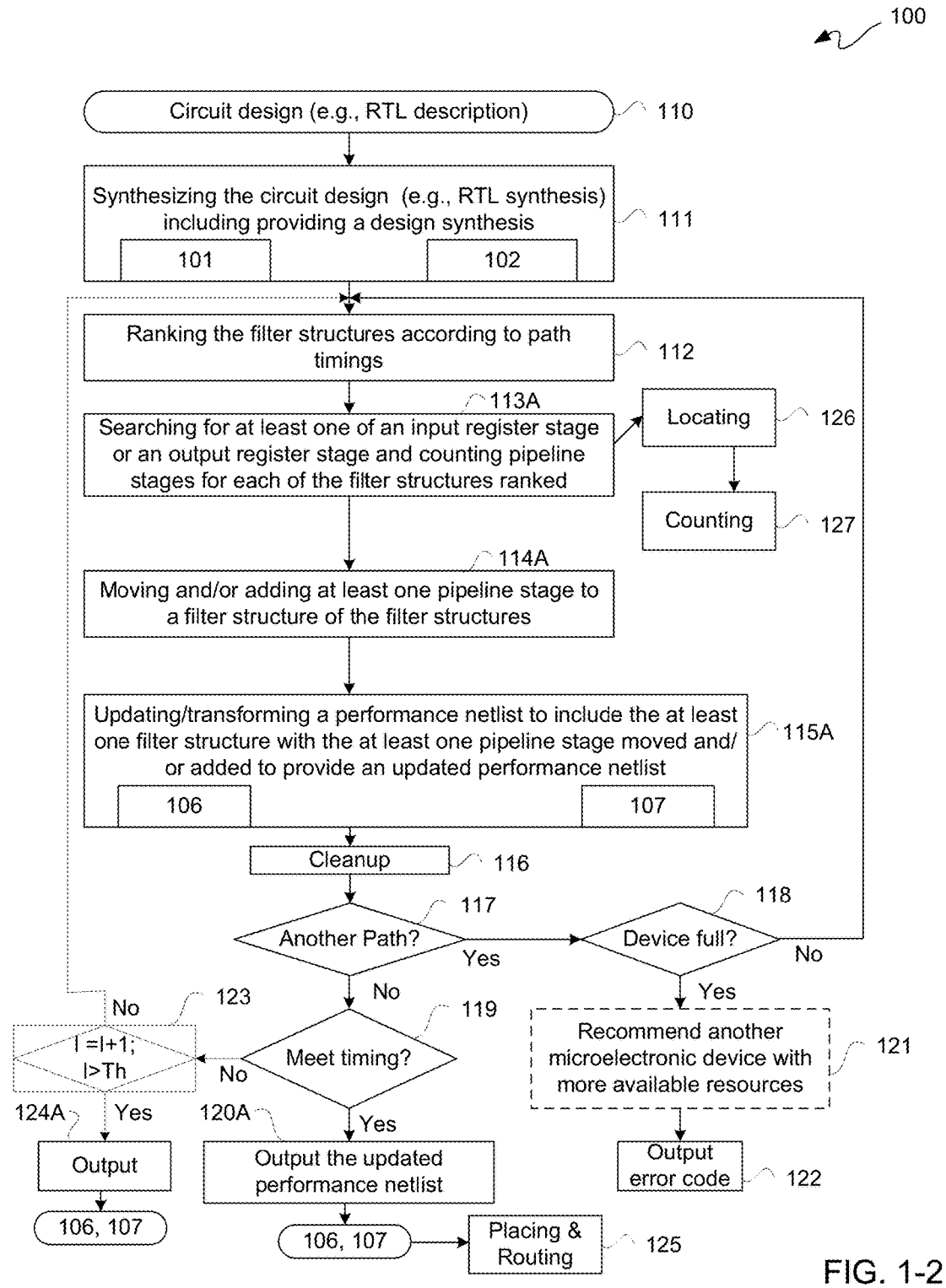
Figure 2:
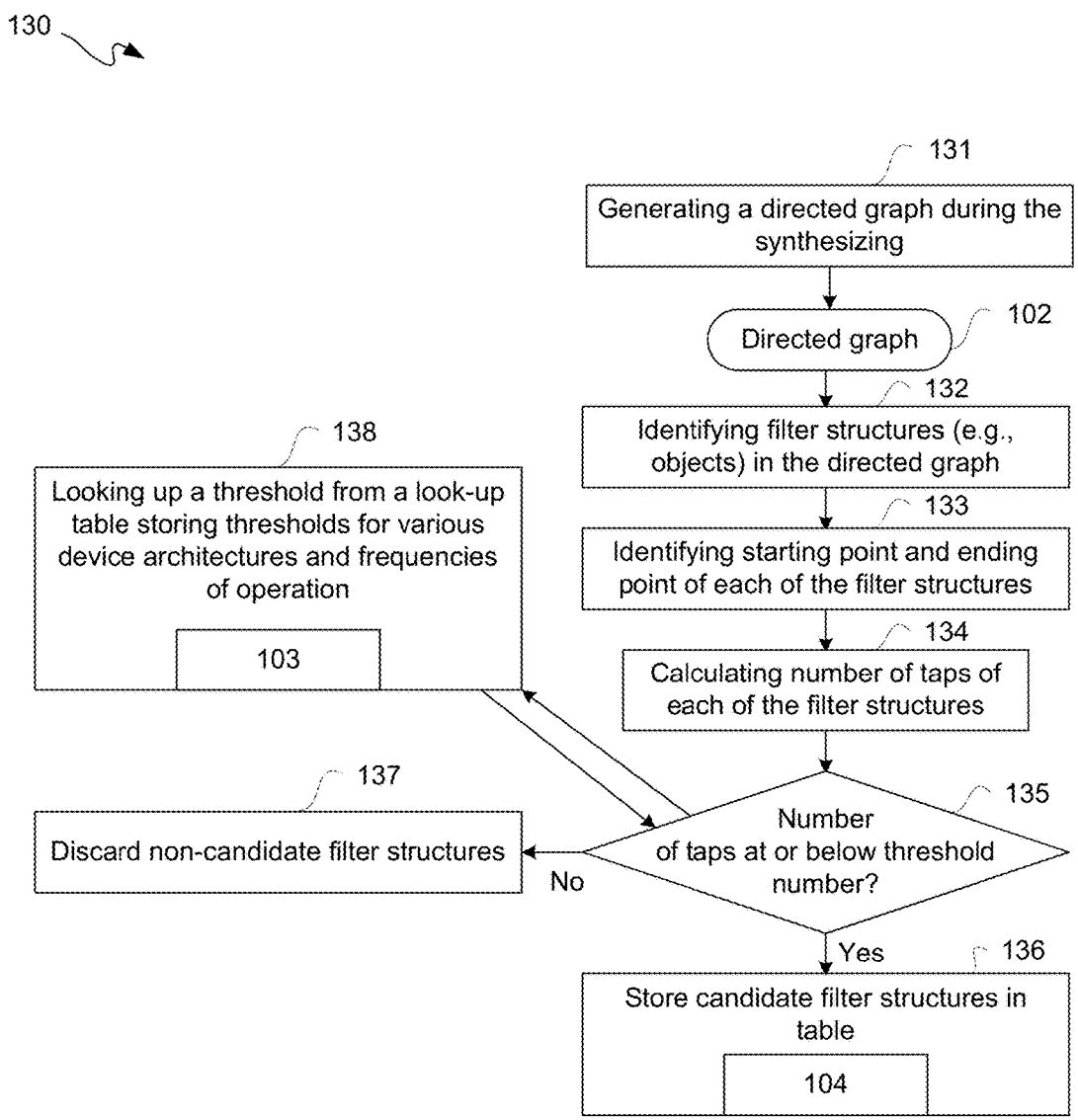

FIG. 2 is a flow diagram illustratively depicting an exemplary design synthesis flow 130 for a synthesizing operation at 111. Design synthesis flow 130 may include operations 131 through 138. With simultaneous reference to FIGS. 1-1 and 2, design synthesis flow 130 is further described.

At 131, a directed graph 102 may be generated during synthesizing at 111. As is known, a directed graph 102 is a representation of circuitry objects or other objects as a set of vertices or nodes with directed edges, arcs or lines, sometimes depicted as edges, arcs or lines with arrows indicating direction of signal propagation, interconnecting such vertices or nodes to form ordered pairs of objects.

Filter structures of corresponding objects in a directed graph 102 generated at 131 may be identified at operation 132. Objects in a directed graph 102 may include one or more filters. Such filters may be represented as a cascaded chain of resource objects, as described below in additional detail. These chains forming filters, such as for example finite impulse response ("FIR") filters, may be present in circuit designs with timing constraints, which can make placing and routing such cascaded chains problematic. Along those lines, after RTL synthesis, a filter chain may be divided into one or more pipelined sections as described below in additional detail in order to both meet timing constraints and to provide a deterministic placement of resources for realizing an implementation of a circuit design, and consequently a deterministic routing.

Again, as these objects may be structurally represented as cascaded chains, such as cascaded chains of digital signal processing blocks, and so objects representing filter structures in a directed graph 102 may be identified. In other words, during an RTL synthesis, an RTL design may be analyzed by a synthesis software tool to generate a directed graph capturing such an RTL design, and regularity and connectivity of logic elements in such an RTL design may be analyzed to identify one or more filter structures therein.

A starting point and an ending point for each of such filter structures identified at 132 may be identified at 133. Using these starting and ending points, a number of taps for each of such identified filter structures may be calculated at 134.

At 135, such number of taps calculated at 134 for each of such identified filter structures may be compared against a threshold number of taps. Each filter structure having a number of taps at or below a threshold number of taps as determined at 135 may be discarded at 137 as non-candidate filter structures, and each filter structure having a number of taps above a threshold number of taps as determined at 135 may be stored at 136 as a candidate filter structure. Such candidate filter structures may be stored at 136 in a table 104, such as in memory of or accessible by a synthesizer used at 111.

Along the above lines, a threshold used at 135 may depend on a device's architecture, such as an FPGA's architecture, with respect to number of digital signal processing blocks in a column, as well as a maximum speed at which each of such digital signal processing blocks may be operated for a particular device, and propagation delays of chained digital signal processing blocks. Such threshold may further depend on a target frequency of operation for a filter structure, number of pipeline register stages of a filter structure, and length of each pipeline section of a filter structure. For purposes of clarity by way of non-limiting example, for a target frequency of operation of 200 MHz, a threshold number of taps may be approximately 40 for some microelectronic devices, and for a 500 MHz frequency of operation target, a threshold number of taps may be approximately 20 for some microelectronic devices. For the last example, if a filter chain having 100 taps was already broken up into 5 pipeline sections of 20 taps each, then such filter chain may not be further optimized for the above example of a 500 MHz frequency of operation target. Thus, generally a threshold number of taps at 135 may be thought of as an optimal number of taps for a filter chain, or pipeline section thereof, for a particular device, number of pipeline register stages and a frequency of operation, and because those filter chains already optimal cannot be further optimized, such optimal filter chains may be discarded at 137.

Moreover, as a threshold number at 135 may vary depending on parametric input including among other possible factors microelectronic device part type (e.g., such as FPGA device type), number of pipeline register stages and target frequency of operation, at 138 a look-up operation may be performed. Along those lines, memory of or accessible by a synthesizer at 111 may perform a look-up operation at 138 from a look-up table 103 of stored threshold numbers of taps in associated with such parametric inputs, and a threshold number of taps may be retrieved from such look-up table 103 responsive to such parametric inputs for populating a threshold value for operation 135.

Figure 3:
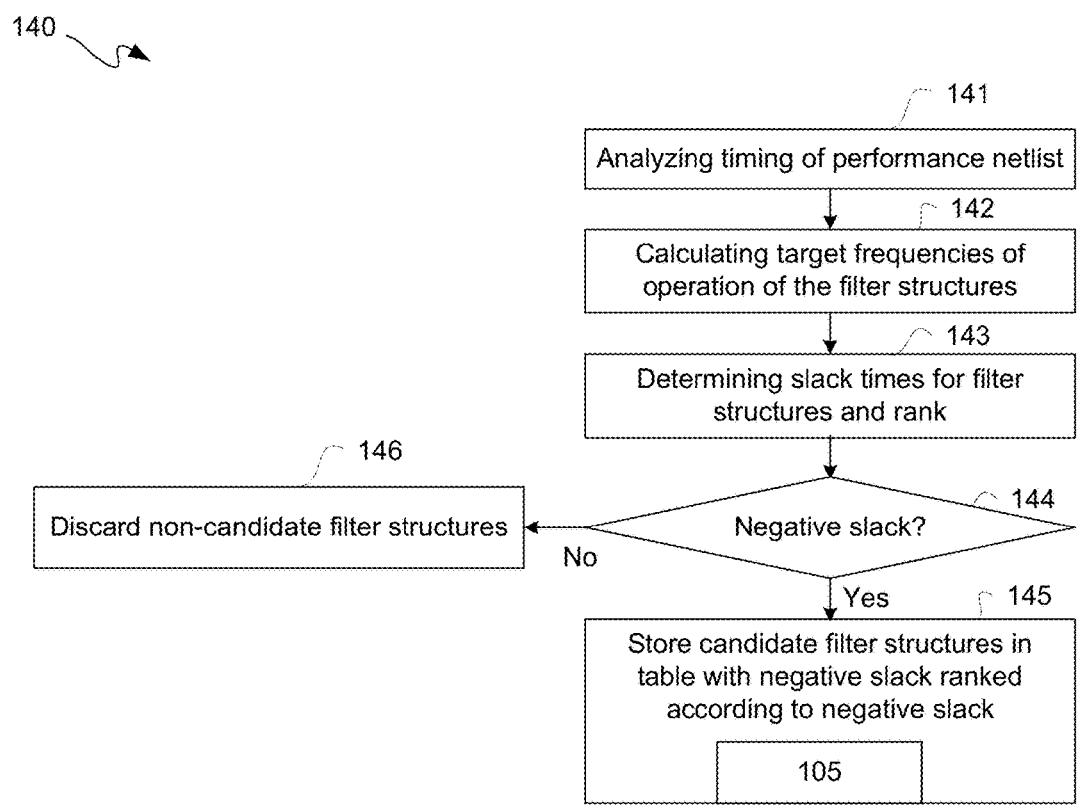
FIG. 3 is a flow diagram illustratively depicting an exemplary ranking flow for a ranking operation.

Returning to FIG. 1-1, after obtaining a set of candidate filter structures stored at 136 in association with slacks, such filter structures stored at 136 may be ranked at 112 according to their corresponding path timings or slack times. FIG. 3 is a flow diagram illustratively depicting an exemplary ranking flow 140 for a ranking operation at 112. Ranking flow 140 may include operations 141 through 146. With simultaneous reference to FIGS. 1-1, 2 and 3, ranking flow 140 is further described.

At 141, timing may be analyzed by a synthesizer for analysis of a performance netlist 101 generated by such a synthesizer. One or more target frequencies of operation for a circuit design for synthesized filter structures stored at 136 may be calculated at 142 by a synthesizer. While a circuit design may include a single filter structure, the following description is directed to the more likely circuit design having multiple filter structures, as placing multiple filter structures is a more complex task than placing a single filter structure. However, the description herein may likewise be used for placing a single filter structure.

At 143, path times, including without limitation slack times, for such filter structures for one or more corresponding target frequencies of operation may be determined and ranked by a synthesizer. Along those lines, objects, having filter structures, may be associated with timing parameters, and these timing parameters may be used as indices to indicate a reference for slack time or slack. Generally, slack or float is associated with activity of an object to indicate available time for such activity as associated with for example path timing, including without limitation critical path timing. Negative slack or float is an amount of time beyond an object's available time allotted for completion of a task. Therefore, zero slack or other positive slack as associated with an object indicates such object does not exceed a time budget for completion of its task or activity, namely meets a performance timing parameter for operation of a circuit design. In contrast, negative slack as associated with an object indicates such object does exceed a time budget for completion of its task or activity, namely does not meet a performance timing parameter for operation of a circuit design.

Generally, one or more path times of one or more cascaded chains in a directed graph 102 in violation of corresponding timing requirements of a circuit design 110 may be identified. As only those filter structures with at least one path time in violation of a corresponding timing requirement, such as at least one negative path slack for example, may need to be adjusted to meet such a timing requirement, such as for example a zero slack threshold, filter structures without any path time violation, such as with only a positive slack for example, may be discarded. Along those lines, at 144 it may be determined if a filter structure has a path timing violation, such as a negative slack. Filter structures with path timing violations, such as negative slacks for example, as determined at 144 may be stored as candidate filter structures in table 105 at 145. Such candidate filter structures may be stored in table 105 in association with and ranked according to their respective path timings, as well as one or more other factors. Filter structures without any path timing violation, such as only positive slacks for example, as determined at 144 may be discarded at 146 as non-candidate filter structures. Thus, for multiple cascaded chains with path timings in violation of corresponding timing requirements for a circuit design 110, each of such cascaded chains may be allocated a rank or priority based on path timings in addition to one or more other constraints, such as frequency and/or number of components in a cascaded chain. Frequency is generally a frequency of operation of such a cascaded chain, and components are generally logic primitives, such as for example DSPs for an FIR filter. For purposes of clarity by way of example and not limitation, negative path slack is used to represent a path timing violation as described below in additional detail.

Returning to FIG. 1-1, after ranking candidate filter structures at 112, at least one pipeline register stage of a filter structure of such candidate filter structures at 104 may be moved within such filter structure to move a negative slack for such filter structure with reference to a timing parameter to or at least closer to a zero slack target. Along those lines, an output and/or input pipeline section may include multiple pipeline register stages. At 113, filter structures from such ranking at 112 may be obtained from a table 105, and each of such filter structures may be searched for at least one of a pipeline input register stage or a pipeline output register stage at 113. Additionally, at 113, pipeline register stages for each of such ranked filter structures may be counted, and such count may be stored in association with each of such corresponding ranked filter structures in table 105. Recall, each of ranked and stored filter structure has passed a threshold test for number of taps; however, an existing number of pipeline register stages may affect how many additional pipeline sections may be created.

Along those lines, searching at 113 may include locating or identifying at 126 a number of movable pipeline register stages found, if any, and counting at 127 such located movable pipeline register stages found. The number of movable pipeline register stages may affect how many additional pipeline sections may be added to an existing cascaded chain forming a filter structure. A counted number of movable pipeline register stages may be stored at 127 in table 105 in association with a filter structure associated with such count.

One or more pipeline register stages may be moved to one or more corresponding interim positions within a filter structure without changing a functional design, including without limitation latency, of such filter structure. If after searching at 113 there is no pipeline register stage of a filter structure that can be moved without changing design function of such filter structure, then such filter structure may be removed from a ranking of such filter structures, or may be flagged for generating a suggested modification as described below in additional detail.

Assuming there is at least one pipeline register stage of at least one filter structure that can be moved as found at 113, then at 114 such at least one pipeline register stage (i.e., a grouping of one or more registers) of at least one filter structure of such ranked filter structures may be moved. Generally, moving at least one pipeline stage is to at least improve a path timing thereof, namely moving at least one pipeline stage is to at least improve timing performance of a cascaded chain; however, in some instances moving of at least one pipeline stage may remove a path timing violation. More specifically, moving at least one pipeline stage may be to adjust a negative slack for such a filter structure with reference to a timing parameter to or at least closer to a zero slack target.

Figure 4:
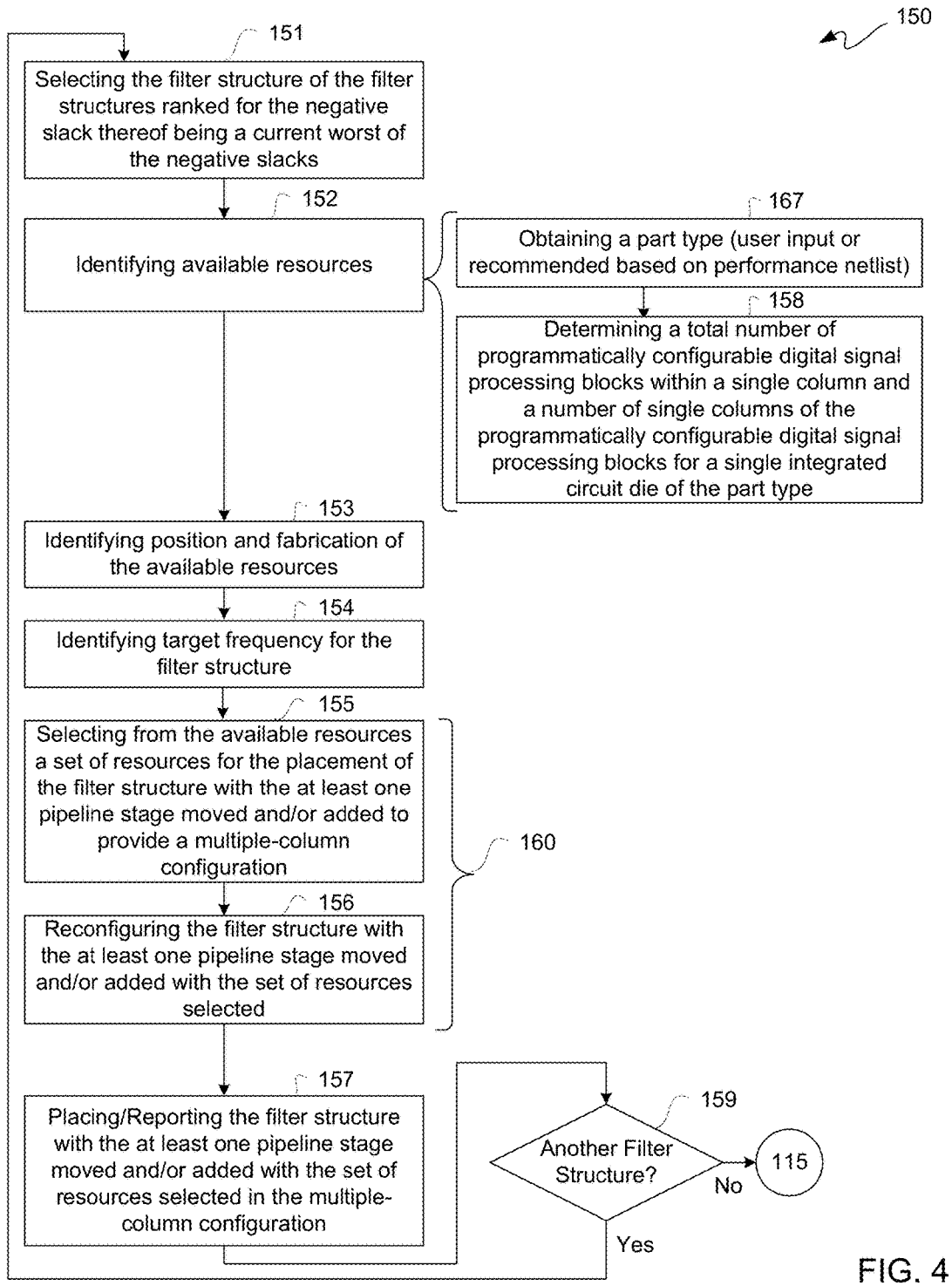
FIG. 4 is a flow diagram illustratively depicting an exemplary moving flow for a moving operation.

FIG. 4 is a flow diagram illustratively depicting an exemplary moving flow 150 for a moving operation at 114. Moving flow 150 may include operations 151 through 159. With simultaneous reference to FIGS. 1-1 and 2 through 4, moving flow 150 is further described.

At 151, a filter structure of filter structures stored and ranked in table 105 for negative slacks may be selected. Generally, a filter structure with a then current worst negative slack of negative slacks stored may be retrieved at 151 for subsequent placement. At 152, available resources may be identified for placement of such filter structure selected at 151. Identification of available resources at 152 may be a blank slate for placement of an initial filter structure into columns of digital signal processing blocks fabric without any prior allocation of such resources. However, after first and subsequent placements of filter structures into such fabric, such pool of available resources, namely not previously allocated for placement, becomes progressively smaller.

Identification of available resources at 152 may include operations at 167 and 158. At 167, a part type may be obtained. For purposes of clarity by way of example and not limitation, a part type may be an FPGA device type. A part type may be obtained by user input, a default device, or selected by a synthesizer based on size of resources of a performance netlist. However, as a device architecture may already have been identified such as for setting a threshold at 135, operation 167 may be inherent as such a parameter may already have effectively been input.

At 158, a total number of programmatically configurable digital signal processing blocks within a single column and a number of columns of such single columns of such programmatically configurable digital signal processing blocks may be determined for part type identified at 167, or for setting a threshold at 135. Because some parts are formed with more than one integrated circuit die, including a die stack, a planar die floor plan of two or more separate die on an interposer, or side-by-side die-to-die chip formed on a same semiconductor wafer, a total number of programmatically configurable digital signal processing blocks and/or a programmatically configurable digital signal processing blocks in a single column may include crossing an inter-die boundary. However, such inter-die boundary crossing may be a significant performance limiting intersection, and so a total number of the programmatically configurable digital signal processing blocks and/or a total number of the programmatically configurable digital signal processing blocks in single column may be determined to preclude any crossing an inter-die boundary, so as not to negatively impact performance of a filter structure. Thus, a determination at 158 may be bounded to a single integrated circuit die of an identified part type.

At 153, position and fabrication of available resources identified at 152 may be identified. Position of resources and/or semiconductor process fabrication node of such resources may be factors in speed of operation and/or propagation delay, among other performance factors. Thus, these factors may be used in selecting from a pool of available resources for placement, including without limitation placing/selecting from digital signal processing blocks of an FPGA or other IC.

At 154, a target frequency of operation for a filter structure may be identified. Some available resources may be more likely than others for reaching a target frequency of operation for a filter structure. Accordingly, selection of resources from a pool of available resources may take into account a target frequency of operation.

At 155, a set of resources may be selected from a pool of available resources for placement of a filter structure selected at 151 with at least one pipeline register stage thereof moved to provide a multiple-column configuration. It may be that moving one or more pipeline register stages alone is not sufficient. Along those lines, one or more pipeline register stages may be added at 155 to provide one or more suggested configurations, though with a change in functioning of such a filter structure. Adding one or more pipeline register stages is described below in additional detail with additional reference to FIG. 1-2.

At 156, a filter structure is reconfigured with at least one pipeline register stage moved with a set of resources selected at 155 for defining a multiple-column configuration for such filter structure with such at least one pipeline register stage moved. Moving one or more registers, namely all registers of a pipeline register stage, may generally be performed by copying a source register multiple times at an identified pipeline register stage, namely copying a number of times equal to a number of control signals feeding into a next pipeline register stage of such a filter structure. Copies of such source pipeline register stage may be relocated to an interim position within such filter structure, and such identified pipeline register stage used for such copying may be removed with connection to and from such pipeline register stage removed interconnected to one another. Addition of a pipeline register stage may likewise involve copying a source pipeline register stage but without deletion and bypass interconnecting of such source pipeline register stage.

Optionally, operations at 155 and 156 may be iteratively be performed for finding an optimal solution, such as in accordance with an optimizing flow 160 of FIG. 6 below.

At 157, such filter structure with at least one pipeline register stage moved using a set of resources selected at 155 may be placed in a multiple-column configuration, such placement including without limitation allocating programmatically configurable digital signal processing resources of an FPGA or other IC. Each pipeline section may be placed in a separate column of DSPs 206 for a one-to-one correspondence between pipeline sections of a filter structure and columns in a multiple-column configuration of such placement.

At 159, it may be determined whether another filter structure of ranked filter structures in table 105 may be selected. If there is another filter structure to be selected, such filter structure may be selected 151 for having moving flow 150 progressively cycle down through to all ranked filter structures from worst to least negative stacks. If it is determined at 159 all ranked filter structures have been processed through moving flow 150, then moving flow 150 may return/go to updating/transforming operation 115.

Selecting a set of resources at 155 and reconfiguring a filter structure with a set of selected resources at 156 may be performed iteratively for an optimal solution to a solution space, namely as defined by a pool of available resources and other factors/parameters as described herein.

Figure 5:
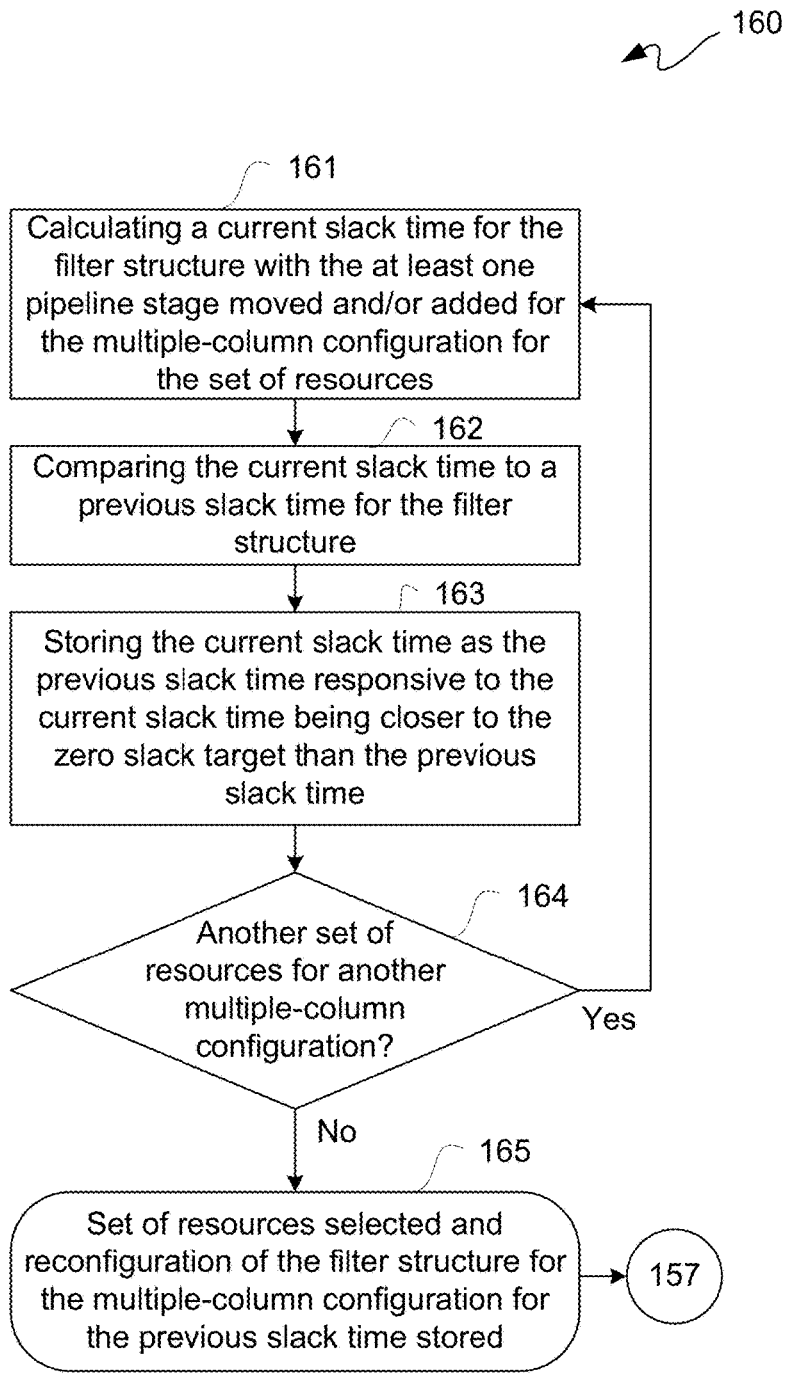
FIG. 5 is a flow diagram illustratively depicting an exemplary optimizing flow for iterated selection and reconfiguration operations.

Along those lines, FIG. 5 is a flow diagram illustratively depicting an exemplary optimizing flow 160 for iterated selection and reconfiguration operations 155 and 156, respectively. Optimizing flow 160 may include operations 161-165. With simultaneous reference to FIGS. 2 through 5 and 11, optimizing flow 160 is further described.

At 161, a current slack time for a filter structure reconfigured at 156 with at least one pipeline register stage moved for a multiple-column configuration for a set of resources selected at 155 may be calculated by a synthesizer. At 162, such current slack time may be compared to a previous slack time for such filter structure. For an initial iteration, such previous slack time may be a negative slack used for ranking such filter structure. At 163, such current slack time may be stored as a new previous slack time responsive to such current slack time being closer to a zero slack target than such old previous slack time. If such current slack time is not closer to a zero slack target than a previous slack time, such associated set of resources and configuration may be indicated as not suitable for a placement, and a set of resources and a filter structure configuration associated with such previous slack time may be continued to be temporarily stored at 165. At 164, it may be determined whether another set of resources for another multiple-column configuration is available for selection at 155 and subsequent reconfiguration at 156. If it is determined at 164 such other set of resources is available, then optimizing flow 160 may repeat at 161 for determining a current slack time for another reconfiguration of a currently processed filter structure for such other set of selected resources. If, however, all possible sets of resources have been considered as determined at 164, then a set of resources selected at 155 for a reconfiguration at 156 for a multiple-column configuration for a currently stored previous slack time 165 may be used at 157 for placement of such resources selected and subsequent routing in accordance with such reconfiguration.

With renewed reference to FIG. 1-1, one or more reconfigured filter structures for having one or more pipeline register stages moved therein as placed at operation 157 may have associated netlists or have associated netlists generated for them by a synthesizer. Along those lines, such one or more reconfigured filter structures may be incorporated into a performance netlist 101 generated by a synthesizer for an input circuit design 110. In other words, at 115 a performance netlist 101 generated at 111 may be transformed or updated to include at least one filter structure reconfigured with at least one pipeline register stage moved as placed at 157 to cause a synthesizer to provide an updated performance netlist 106 and an updated directed graph 107. More generally, output of a transformation at 115 is a netlist with an improved timing characteristic or improved timing characteristics as compared with circuit design 110. At 116, such updated performance netlist may undergo a cleanup operation, which may be used cleanup an updated directed graph 107, namely to connect any unconnected nodes for an updated performance netlist 106. Such updated directed graph 107 may be used as a directed graph 102 for a subsequent iteration with a re-ranking at 112.

After cleanup at 116, it may be determined at 117 whether another path is to be processed for another filter structure of such other path. If another path is to be processed as determined at 117, then at 118 it may be determined whether a microelectronic device, such as an FPGA or other IC, as previously identified has sufficient room for placement for another iteration of operation 114. If it is determined at 118 that a currently selected microelectronic device is not full for purposes of another iteration of 114 for another path, then such other iteration for such other path may begin at 112 using a then current updated performance netlist 106 and an associated updated directed graph 107 in place of originally generated performance netlist 101 and associated directed graph 102. If, however, at 118 it is determined that a currently selected microelectronic device is full for purposes of another iteration starting at 112, then optionally another microelectronic device with more available resources than a currently select microelectronic device for placement of filter structures may be recommended at 121. Moreover, from 118 or 121, an error code may be output at 122 indicating an insufficient amount of available resources for a currently identified microelectronic device.

If, at 117, it is determined that no other path is to be processed for a filter structure, then at 119 it may be determined whether all processed paths with filter structures meet timing parameters, namely each such filter structure has a zero slack or other positive slack. In other words, if it is determined at 119 that no filter structure has a negative slack, then at 120 a then current updated performance netlist ("updated netlist") 106 may be output from a synthesizer, optionally along with an associated updated directed graph 107, and at 125 placing and routing may be conventionally be performed though responsive to such updated netlist 106. Optionally, placing, as well as routing, may be performed at operation 157, as described elsewhere herein.

If, however, it is determined at 119 that at least one filter structure has a negative path slack associated therewith, then at 123 an iteration counter may optionally be incremented for comparison against a threshold count. If a threshold count is not exceeded as determined at 123, then another cycle may commence with a re-ranking at 112 using a then current updated performance netlist 106 and associated updated directed graph 107, as previously described. It should be appreciated that such re-ranking at 112 may result in storing candidate filter structures in table 105 still having a negative slack. If, however, after a threshold number of iterations is performed as determined at 123, then a then current updated performance netlist 106 and associated updated directed graph 107 may be output at 124 along with a table of any and all remaining filter structures having corresponding negative slacks. In other words, if a solution space cannot be converged to having no negative path slack for any and all filter structures after a threshold number of iterations, then output at 124 may indicate same with or without a then current updated performance netlist 106 and/or associated updated directed graph 107.

FIG. 1-2 is a flow diagram illustratively depicting another exemplary placement of resources flow 100. Placement of resources flow 100 may be part of a computer aided design software tool or other software tool. Placement of resources flow 100 may include operations, generally indicated as operations 111 through 127, including operations 113A, 114A, and 115A. Placement of resources flow 100 of FIG. 1-2 is the same as that of FIG. 1-1, except for addition of moving and/or adding at least one pipeline register stage and affects thereof. Accordingly, same description of placement of resources flow 100 as between FIGS. 1-1 and 1-2 is generally not repeated for purposes of clarity and not limitation.

Operations at 113 and 113A are generally the same, except if a search at 113A reveals one or more filter structures without any movable pipeline register stage, then optionally one or more pipeline register stages may be added to such one or more filter structures. Along those lines, one or more filter structures without any movable pipeline register stage and having corresponding negative slacks may be reconfigured or otherwise modified at 114A to add one or more pipeline register stages to move or otherwise adjust corresponding negative slacks to or toward a zero slack target. Generally, whenever during enhancing, such as optimizing a cascaded structure, no candidate pipeline stage is found for moving within such cascaded structure with zero or more pipeline registers, analysis as described herein is preformed, and a report is generated advising a designer user to add one or more additional pipeline register stages to enhance performance of such cascaded structure. Along those lines, such a generated report may describe possible locations where one or more additional pipeline registers may be inserted by a designer user in order to enhance performance.

Moreover, even if a filter structure has one or more movable pipeline register stages, such movement may be insufficient for attaining a zero slack target. In such an event, one or more pipeline register stages may be added to such a filter structure along with moving one or more pipeline register stages thereof to move a corresponding negative slack to or closer to a zero slack target. Along those lines operations at 155 and 156 of FIG. 4 for placement of resources flow 100 of FIG. 1-2 may be for selecting from available resources a set of resources for placement of a filter structure with at least one pipeline register stage added, or at least one pipeline register stage moved and at least one other pipeline register stage added, to provide a multiple-column configuration. At 156, such a filter structure may be reconfigured with either such at least one pipeline register stage added, or at least one pipeline register stage moved and at least one other pipeline register stage added, with such set of resources selected. At 157, such a filter structure with such at least one pipeline register stage added may have a report generated therefor indicating to a user designer locations of possible addition of one or more pipeline register stages to be added to enhance performance. This report may include a possible netlist for a proposed reconfiguration. If at 157 at least one pipeline register stage is moved and at least one other pipeline register stage is added, then for such at least one register stage moved, corresponding resources from such set of resources selected may be placed, as well as routed, in a multiple-column configuration for movement of such at least one pipeline register stage. However, for at least one pipeline register stage added, a report may be generated to add such at least one pipeline register stage, as previously described. This report may include a possible netlist for a proposed reconfiguration in addition to a netlist with such at least one pipelined register stage moved for an actual reconfiguration. At 161 of FIG. 5, a current slack time may be calculated for such a filter structure with either such at least one pipeline register stage added, or at least one pipeline register stage moved and at least one other pipeline register stage added, for providing a multiple-column configuration using such set of resources selected. This current slack time may be reported to a designer user for purposes of informing same as to current slack time for one or more moved registers, as well as optionally informing a designer user possible enhance of performance by addition of one or more pipeline registers. According optimization flow 160 may be used for iterated operations at 155 and 156.

At 115A, a performance netlist 101 may be transformed or otherwise updated to include at least one filter structure with at least one pipeline register stage moved and/or added to provide an updated performance netlist 106, as well as an updated directed graph 107 associated with such updated performance netlist 106. If not all timing parameters may be met without having added at least one pipeline register stage, then meeting all timing parameters as determined at 119 may result in an output at 120A. However, because at least one pipeline register stage is added to a filter structure as reflected in an updated performance netlist output at 120A, such change in functionality may be indicated in output at 120A, namely indicating each instance in which one or more pipeline register stages were added in order to meet a zero slack target. Along those lines, output 120A effectively becomes a suggestion of how to improve performance to meet a zero slack target at the expense of a change in functionality, which may or may not be acceptable for a circuit design's purpose. Output at 124A may be the same as at 120A, except not every path slack for filter structures meets a zero slack target.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 6 illustrates an FPGA architecture 200 that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs also include dedicated processor blocks ("PROC") 210.

In some FPGAs, each programmable tile includes a programmable interconnect element ("INT") 211 having standardized connections to and from a corresponding interconnect element in each adjacent tile. Therefore, the programmable interconnect elements taken together implement the programmable interconnect structure for the illustrated FPGA. The programmable interconnect element 211 also includes the connections to and from the programmable logic element within the same tile, as shown by the examples included at the top of FIG. 6.

For example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 206 can include a DSP logic element ("DSPL") 214 in addition to an appropriate number of programmable interconnect elements. An IOB 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured embodiment, a horizontal area near the center of the die (shown in FIG. 6) is used for configuration, clock, and other control logic. Vertical columns 209 extending from this horizontal area or column are used to distribute the clocks and configuration signals across the breadth of the FPGA.

Figure 6:
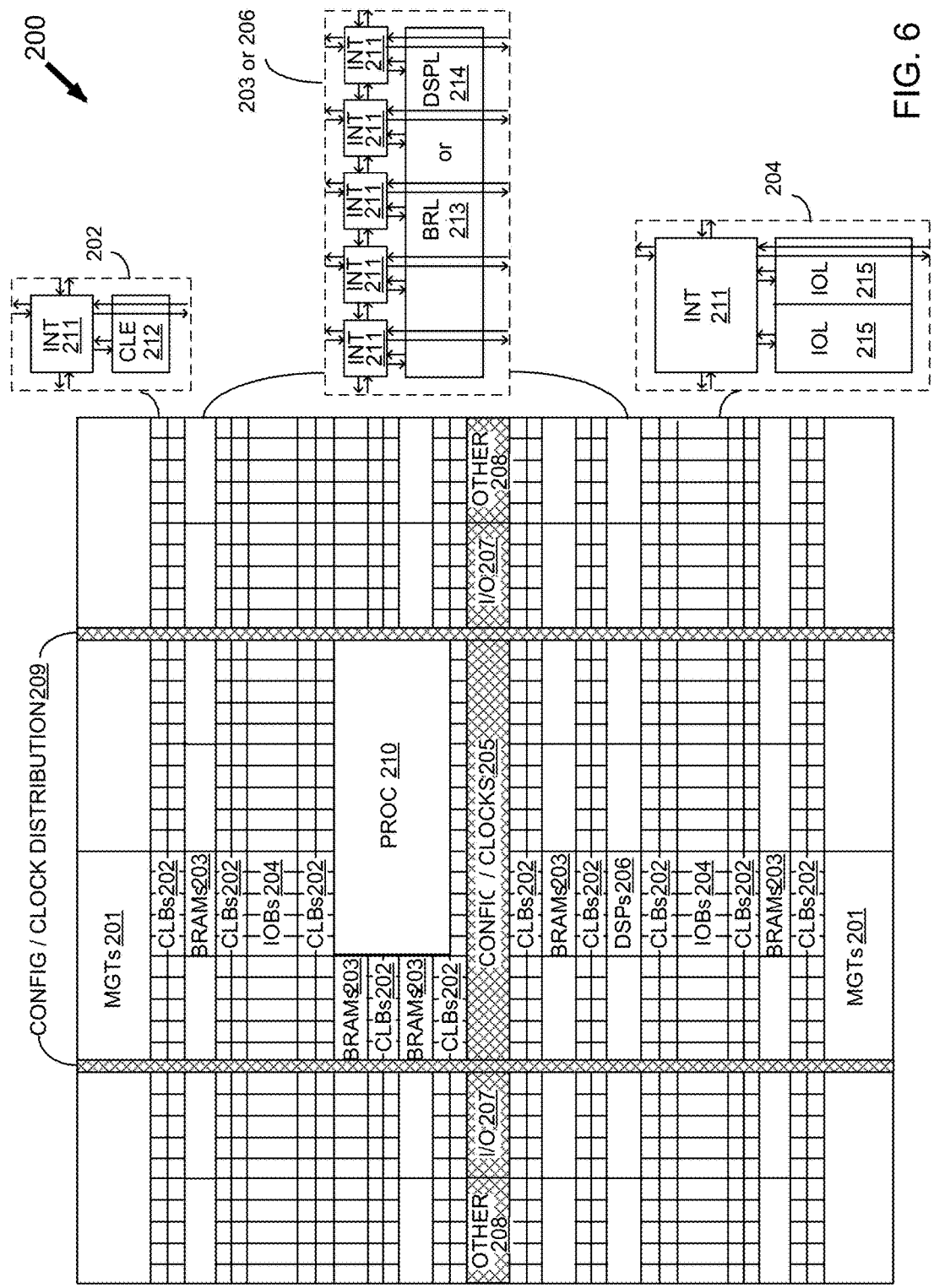
FIG. 6 is a simplified block diagram depicting an exemplary columnar Field Programmable Gate Array ("FPGA") architecture.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 210 spans several columns of CLBs and BRAMs.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 7:
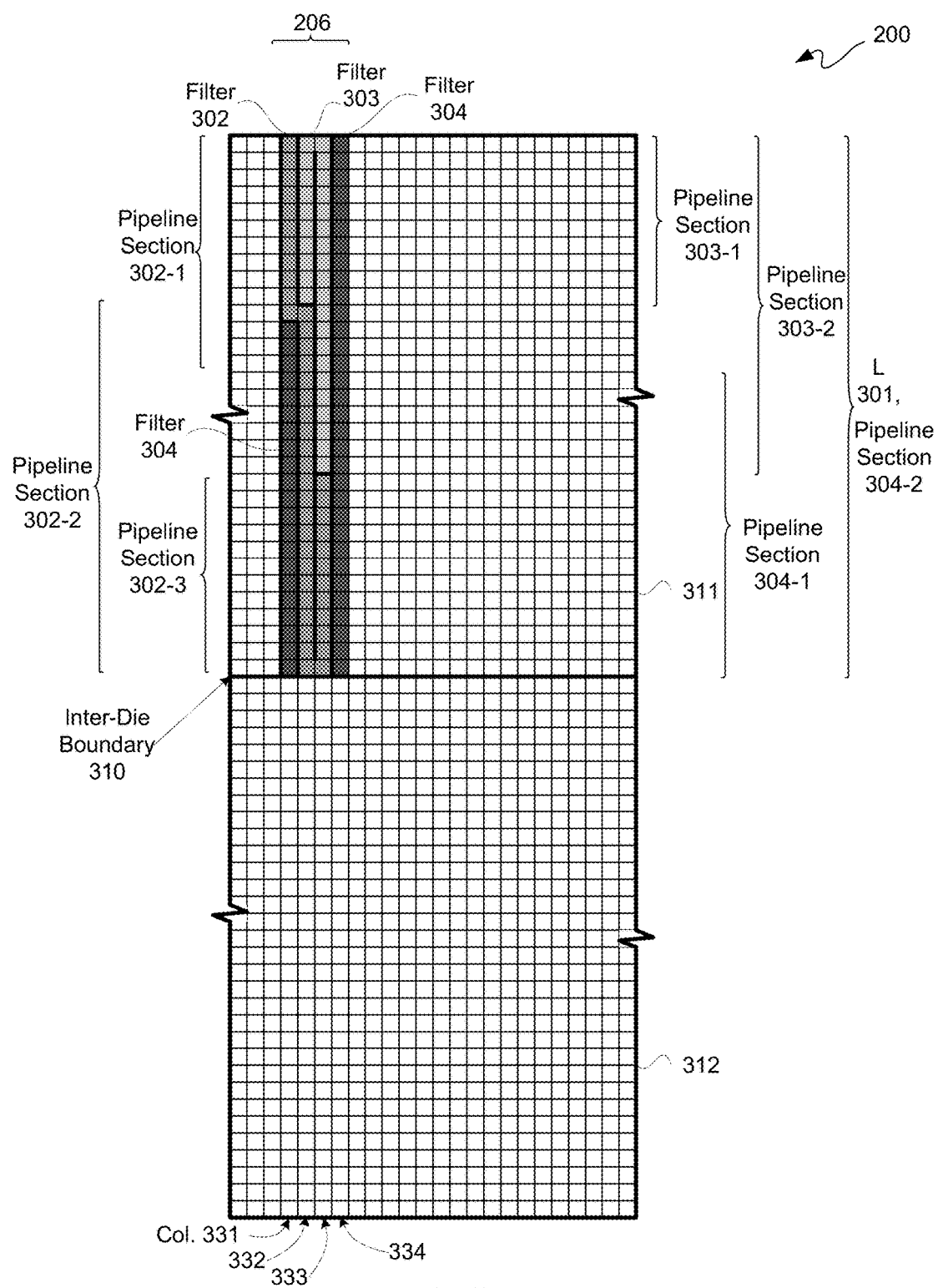
FIG. 7 is a block diagram illustratively depicting an exemplary portion of an FPGA having columns of digital signal processing blocks ("DSPs").

FIG. 7 is a block diagram illustratively depicting an exemplary portion of an FPGA 200 having columns of DSPs 206. In this example, FPGA 200 is formed of two interconnected IC dies, namely IC die 311 and IC die 312. IC dies 311 and 312 may be formed on a same wafer next to one another so as to be diced as a unified whole. Because of lithographic limitations, separate dies 311 and 312 may be formed with interconnect wires spanning an inter-die boundary 310 rather than having a single die. However, because crossing an inter-die boundary 310 with interconnect wires is a significant performance inhibitor, DSPs 206 may be placed on only one of such dies for a filter structure in order to avoid an inter-die boundary 310 performance limiter.

In this example, there are multiple-column configured filters 302 through 304. Filter 302 is formed of three pipeline sections 302-1 through 302-3. Pipeline sections 302-1 and 302-2 may be delineated from one another by at least one pipeline register stage, and pipeline sections 302-2 and 302-3 may be delineated from one another by at least one other pipeline register stage. Filter 303 is formed of two pipeline sections 303-1 and 303-2. Pipeline sections 303-1 and 303-2 may be delineated from one another by at least one pipeline register stage. Lastly, filter 304 is formed of two pipeline sections 304-1 and 304-2. Pipeline sections 304-1 and 304-2 may be delineated from one another by at least one pipeline register stage.

Overall length L 301 of a column of DSPs 206 for a die 311 may be used for providing a filter structure. However, if a length L 301 of a column is not available for placement of a filter structure, then an ability to divide a filter structure into a pipeline structure so as to use portions of a column of length L 301 without crossing an inter-die boundary 310 may enhance utilization rate of resources. Moreover, by being able to use portions of columns of a die 311, a more dense packing of DSPs 206 may be used for multiple filter structures for filters, such as filters 302 through 304 for example. Pipeline sections, such as pipeline sections 302-1 through 302-3 for example, may be separated from one another by pipeline register stages with a one-to-one correspondence between pipeline sections and columns of DSPs 206, including partial columns. For filters 302 and 303, only contiguous columns in this example are used for providing corresponding filter structures. For example, DSPs 206 in columns 331-333 of die 311 are used for placement or allocation of resources of filter 302, where columns 331-333 provide a contiguous grouping of columns for a multiple-column configuration. Moreover, DSPs 206 in columns 332-333 of die 311 are used for placement or allocation of resources of filter 303, where columns 332-333 provide a contiguous grouping of columns for a multiple-column configuration.

However, for the example of DSPs 206 in columns 331 and 334 of die 311 used for placement or allocation of resources of filter 304, columns 331 and 334 provide a multiple-column configuration without a contiguous grouping of columns. Along those lines, by parsing a filter structure into multiple pipeline sections, a multiple-column configuration need not be a contiguous grouping of columns, but may have one or more gap columns, such as columns 332 and 333 with respect to filter 304, between columns of such a multiple-column configuration. Moreover, programmatically configurable DSPs 206 used to provide a multiple-column configuration for a filter structure, such as for filters 302 and 304 for example, may exceed the total number of programmatically configurable DSPs 206 within a single column, such as column 331 for example, with respect to a die 311. Moreover, the particular number of DSPs 206 illustratively depicted for a column is merely a non-limiting example, and other numbers of DSPs 206 may be present in a column.

A cascaded chain of programmatically configurable DSPs 206 may include at most a single pipeline with one or more pipeline sections with either or both a movable input pipeline register stage or a movable output pipeline register stage prior to moving thereof. Such moving may be used to provide an interim pipeline register stage after moving of either such a movable input pipeline register stage or a movable output pipeline register stage. Such interim pipeline register stage may be disposed between a starting point and an ending point of such a single pipeline. A filter structure may be a finite impulse filter structure formed of a cascaded chain of programmatically configurable DSPs 206.

Figures 1, 8:
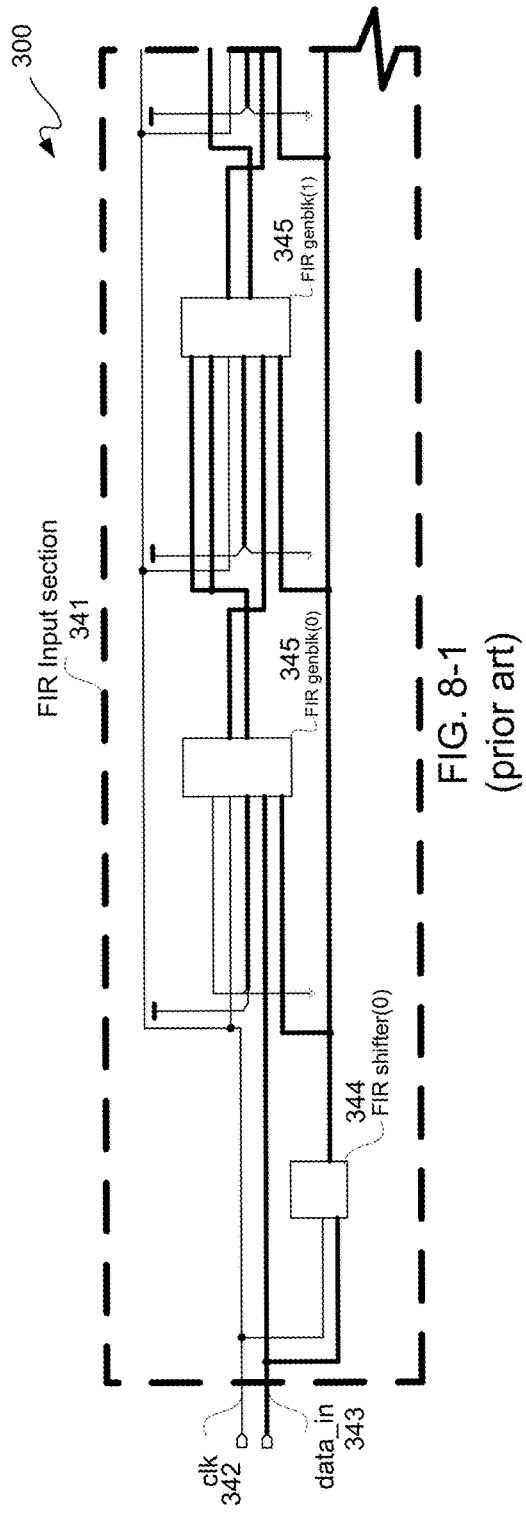
Figures 2, 8:
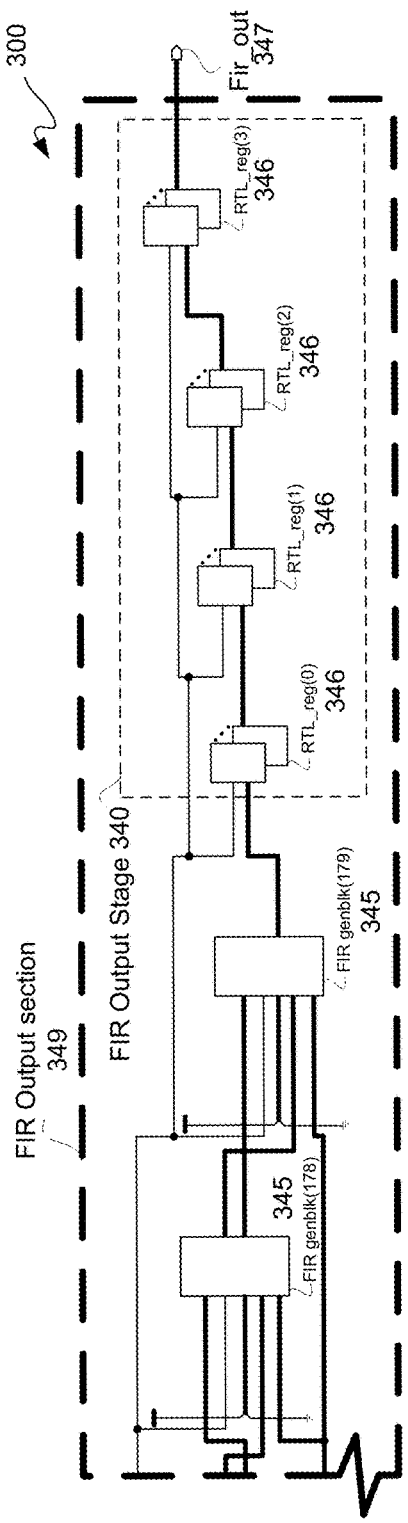
Figures 3, 8:
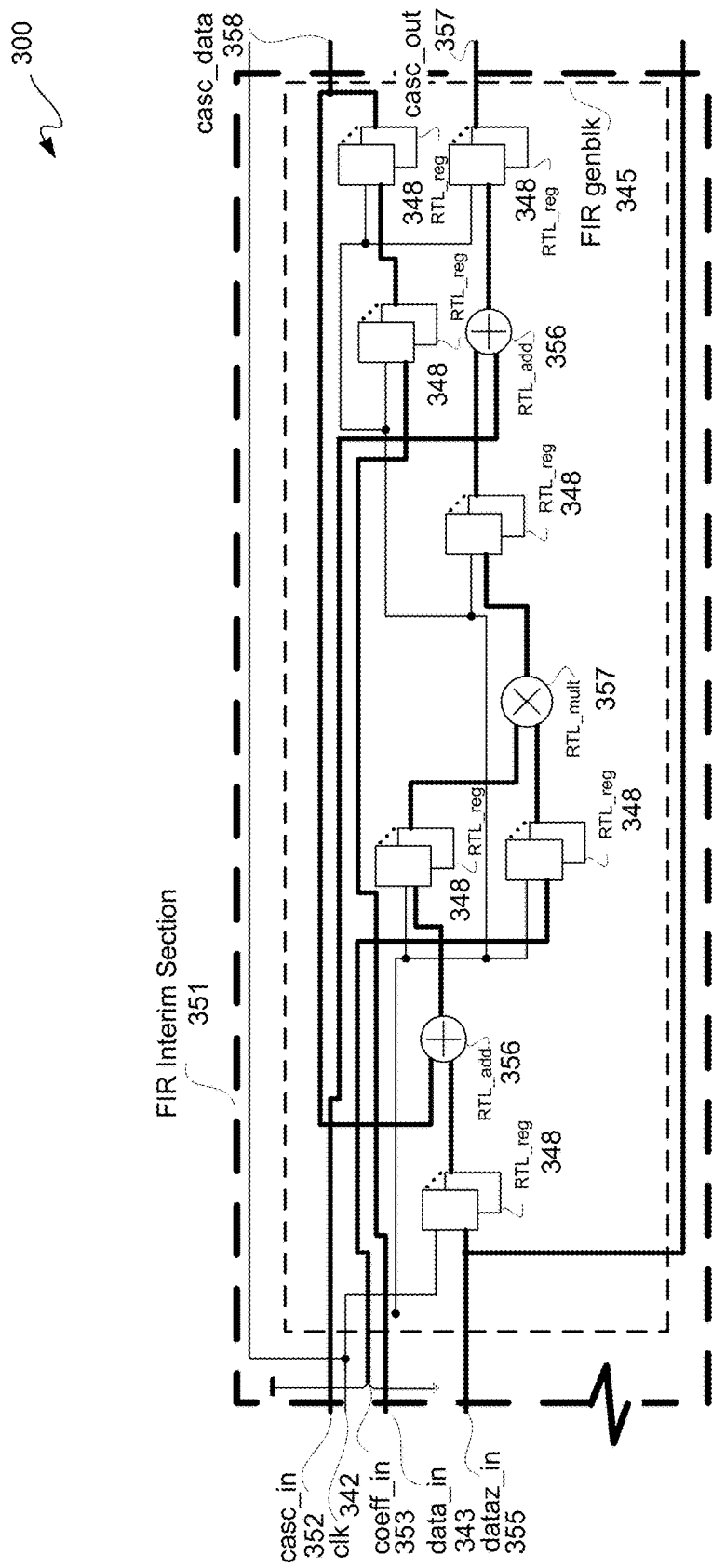

FIGS. 8-1 through 8-3 is a schematic diagram illustratively depicting an exemplary conventional cascaded chain forming a finite impulse response ("FIR") filter design ("FIR design") 300. FIR input, interim and output sections 341, 351 and 349 may represent a conventional placement and routing of an FIR design 300.

FIR input section 341 may include a shifter or shift register 344 and FIR generation blocks 345 coupled to one another in a known manner. Additionally, FIR input section 341 may receive a clock signal input ("clock" or "clk") 342 and a data input 343, where generally data input bussing has a number of bits in parallel, as generally depicted with thicker black lines than a thinner line for a signal, such as a clock 342. Coefficient values may be input by selectively coupling bit positions to either power or ground. DSPs 206 may have cascaded input and cascaded output ports, as is known, for cascading DSPs 206 to instantiate an FIR design.

Likewise, FIR output section 349 may include FIR generation blocks 345 and may be coupled to FIR input section 341 downstream thereof to provide an FIR output 347 in a known manner. In this particular example, FIR output section 349 includes an FIR output stage 340 having four RTL pipeline register stages 346. Either or both an input stage or an output stage of an FIR design may include one or more input or output register stages 346; however, in this particular example an FIR shift register 344 is used for shifting data into an FIR design with four RTL pipeline register stages 346 for output. Moreover, even though four RTL pipeline register stages 346 are illustratively depicted in this example for purposes of clarity by way of example, more or less than four pipeline register stages may be used in other examples for input and/or output FIR stages. Furthermore, an FIR design may have no RTL pipeline register stages 346. Lastly, at least one of pipeline stage, in this example of four RTL pipeline stages 346, is to be unmovable to preserve functionality of a circuit design 110.

FIR interim section 351 may be coupled between FIR input section 341 and FIR output section 349, namely downstream of FIR input section 341 and upstream of FIR output section 349. FIR interim section 351 may include an FIR generation block 345 coupled to receive a cascaded data input ("casc_in") 352, clock 342, data input 343 from output of shift register 344, and data input ("dataz_in") 355 from output of a DSP 206 internal register. Furthermore, FIR generation block 345 may have a coefficient data input bus ("coeff_in") 353 with selected bit inputs thereof coupled either to a supply voltage or a ground voltage to provide a coefficient value input.

FIR generation block 345 may include RTL FIR register stages 348 used for storing values, such as for example RTL adders/subtractors 356 or an RTL multiplier 357 or a cascaded data output stage, such as for providing cascaded data 358 or a cascaded output 357. However, RTL FIR register stages 348 are an integral part of function of an FIR design. In contrast, RTL pipeline register stages 346 are less consequential FIR design function, and according RTL pipeline register stages 346 may be moved, as described below in additional detail.

Because the FIR design of FIGS. 8-1 through 8-3 represents a synthetic design, RTL designation of some elements is used. However, an actual instantiation in actual circuitry follows from placement and routing in accordance with such an RTL schematic. Moreover, even though the example of FIG. 8 is for a 180-tap FIR filter, in another implementation fewer or more than 180 taps may be implemented, as may vary from application-to-application.

In a conventional instantiation of the FIR design of FIG. 8, DSPs 206 for taps numbered 0-119 of a 120 DSP column may be used along with another 60 DSPs 206 for taps numbered 120-179 in an immediately adjacent DSP column. Conventionally, a synthesis software tool or synthesizer automatically starts an FIR chain of DSPs with a first ("bottom") DSP 206 in a column and proceed to a last ("top") DSP 206 in such column without crossing an inter-die boundary, and for chains longer than such a column, a synthesizer may continue placing DSPs 206 linearly in an immediately adjacent column, which in this example would start at about DSP 60 of such immediately adjacent column and proceed to DSP 119 of such immediately adjacent column.

Figures 1, 9:
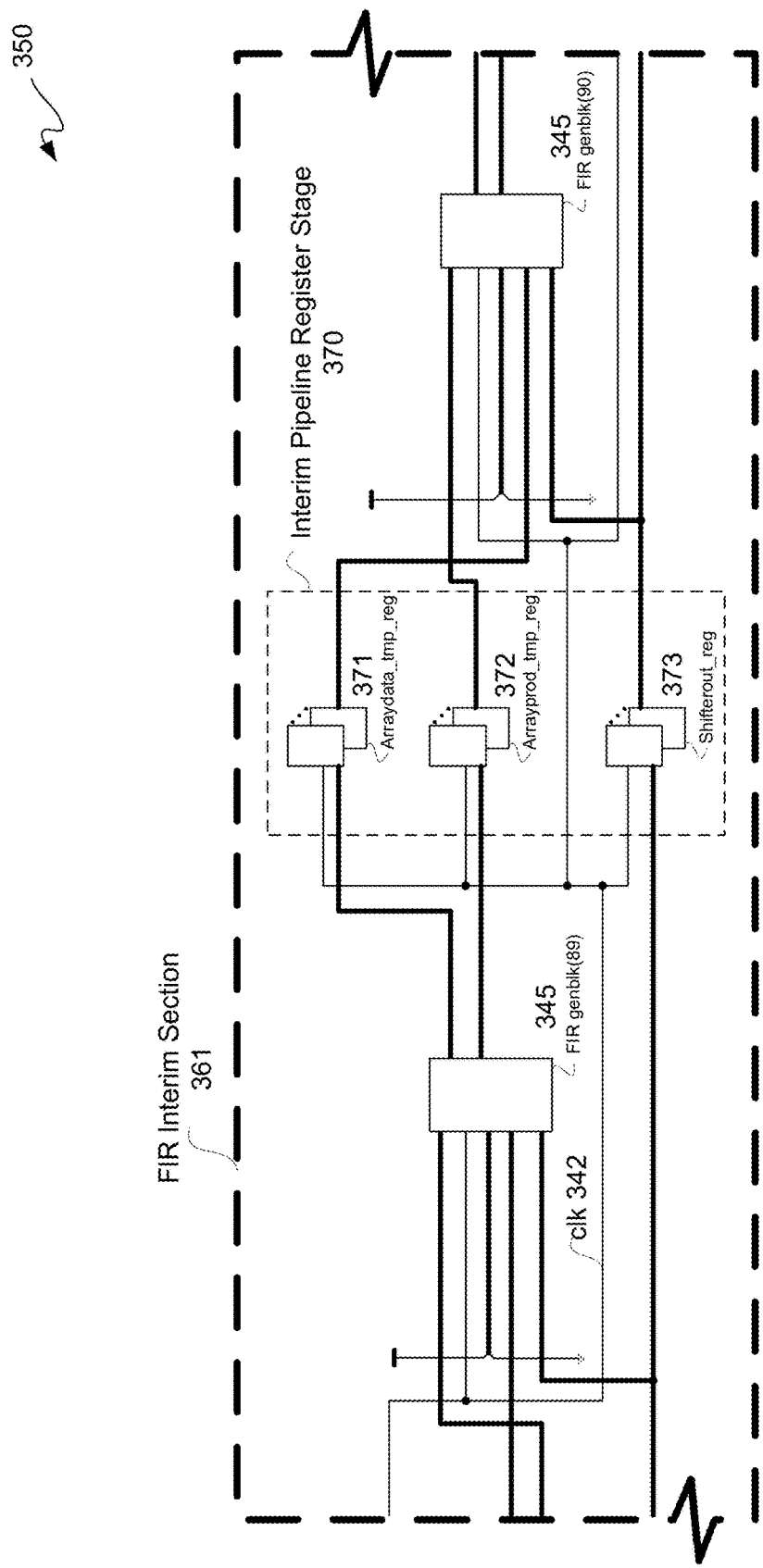
Figures 2, 9:
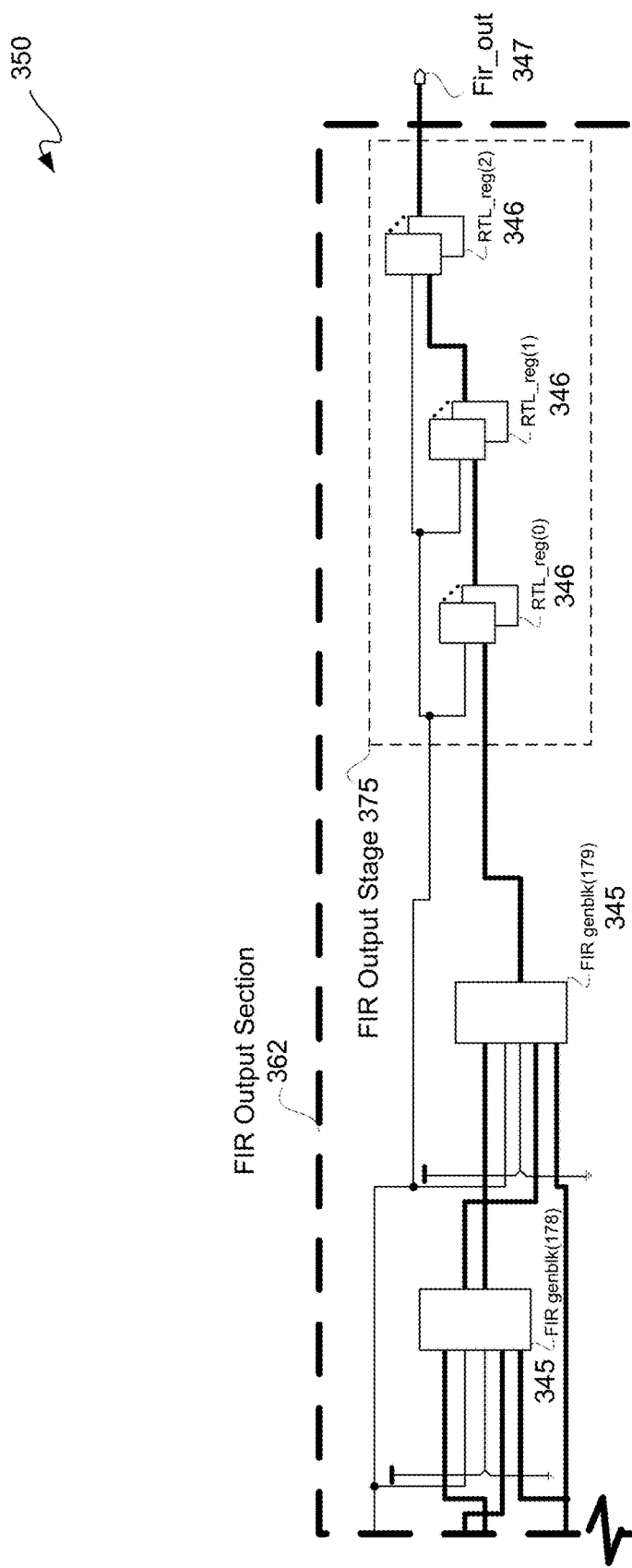

FIGS. 9-1 and 9-2 is a schematic diagram illustratively depicting an exemplary FIR interim section 361 and an exemplary output section 362 respectively of FIGS. 8-2 and 8-3 after moving of a single RTL pipeline register stage 346 to provide a reconfigured cascaded chain. Reconfigured cascaded chain, namely an FIR filter 350, may have a same FIR input section 341 as in FIG. 8-1, and so such description is not repeated for purposes of clarity and not limitation.

In this example, an RTL pipeline register stage 346 of FIR output stage 340 is moved to provide a revised or reconfigured FIR output stage 375 having three rather than four RTL pipeline register stages 346 of FIG. 8-3. The moved RTL pipeline register stage 346 is effectively interim pipeline register stage 370 of FIR interim section 361. In this example, interim pipeline register stage 370 may be located between FIR generation blocks 345 corresponding to taps 89 and 90 for the example of a 180-tap FIR filter. Effectively in this example, an RTL pipeline register stage 346 may be pushed from a top-level output to a 90-tap FIR output. Along those lines, a 180-tap FIR filter design may be reconfigured to be two 90-tap FIR filter designs cascade pipelined one-to-the other though without changing a number of pipeline register stages of such 180-tap FIR filter design.

Interim pipeline register stage 370 may include three RTL pipeline register stages all clocked responsive to a same clock 342 for three separate data busses. In this example, such data busses correspond to a cascaded data, a cascaded output, and an FIR shift register output respectively coupled to an array data temporary register 371, an array product temporary register 372, and a shifter output register 373 of interim pipeline register stage 370. Generally, a moved RTL pipelined register stage 346 may be instantiated as an interim pipeline stage by copying such RTL pipeline register stage 346 for each data buss instance in which an interim pipeline register stage 370 is to be inserted.

Figures 2, 10:
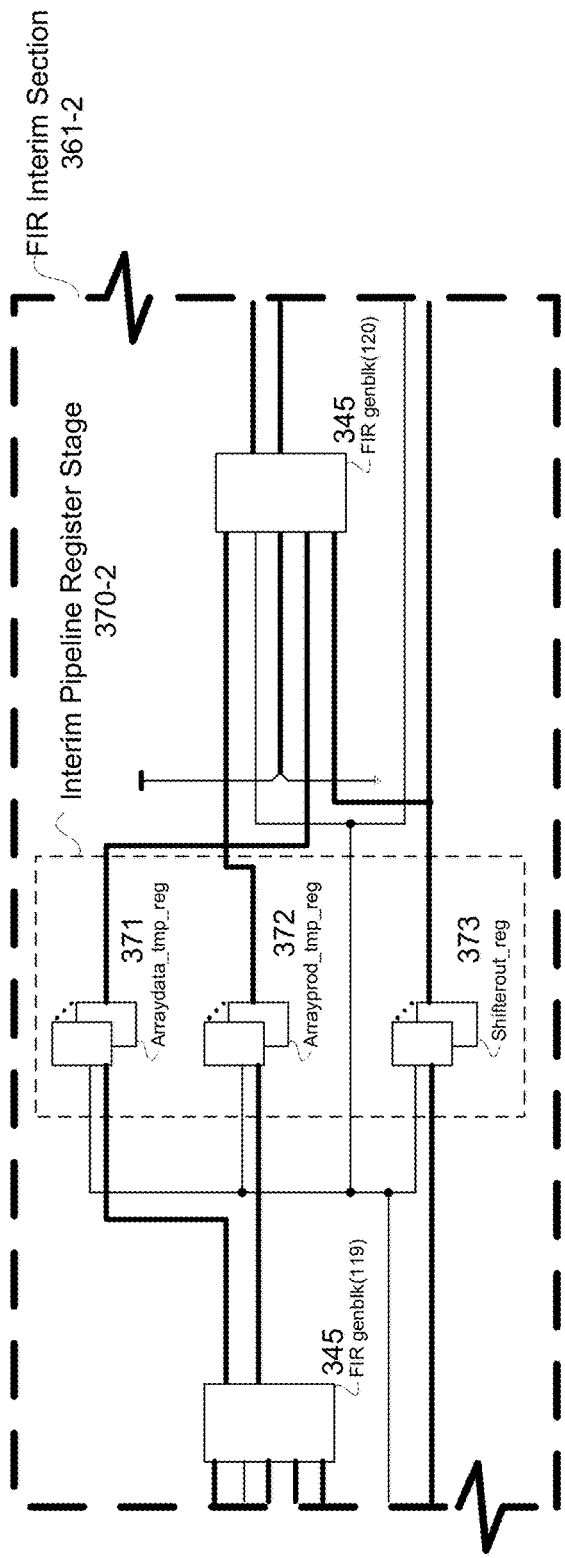
Figures 3, 10:
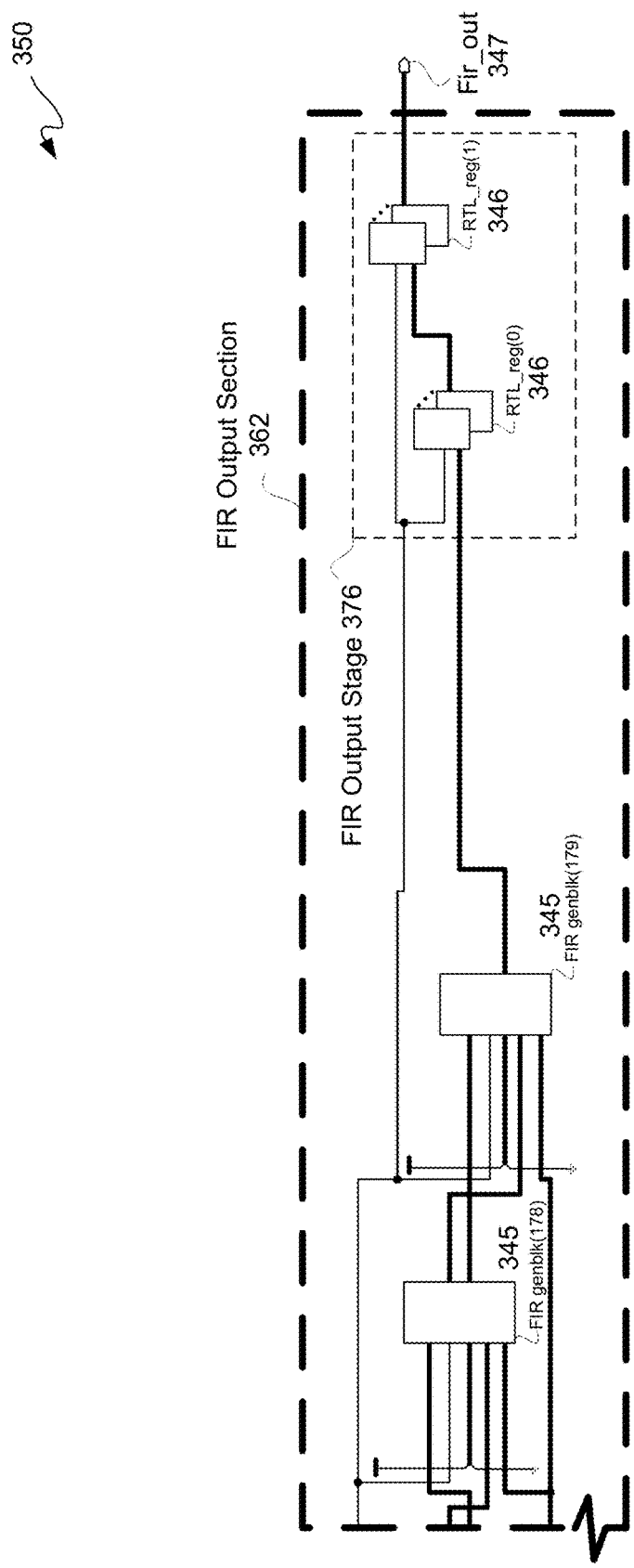

Continuing the above example though for moving two RTL pipeline register stages 346, FIGS. 10-1 through 10-3 is a schematic diagram illustratively depicting an exemplary FIR interim section 361-1, FIR interim section 361-2 and FIR output section 362 after moving of two RTL pipeline register stages 346 of FIG. 8-3. In this example, two RTL pipeline register stages 346 of FIR output stage 340 are moved to provide a revised or reconfigured FIR output stage 375 having two rather than four RTL pipeline register stages 346 of FIG. 8-3. One of such moved RTL pipeline register stages 346 is effectively interim pipeline register stage 370-1 of FIR interim section 361-1. In this example, interim pipeline register stage 370-1 may be located between FIR generation blocks 345 corresponding to taps 59 and 60 for the example of a 180-tap FIR filter, and interim pipeline register stage 370-2 may be located between FIR generation block 345 corresponding to taps 119 and 120 for the example of a 180-tap FIR filter. Along those lines, a 180-tap FIR filter design may be reconfigured to be three 60-tap FIR filter designs cascade pipelined one-to-the other though without changing a number of pipeline register stages of such 180-tap FIR filter design.

Interim pipeline register stages 370-1 and 370-2 may likewise each include three RTL pipeline register stages all clocked responsive to a same clock 342 for three separate data busses though at two different locations. In this example, such data busses correspond to a cascaded data, a cascaded output, and an FIR shift register output respectively coupled to an array data temporary register 371, an array product temporary register 372, and a shifter output register 373 of interim pipeline register stage 370-1, and to a cascaded data, a cascaded output, and an FIR shift register output respectively coupled to an array data temporary register 371, an array product temporary register 372, and a shifter output register 373 of interim pipeline register stage 370-2. Generally, one moved RTL pipelined register stage 346 may be instantiated as an interim pipeline stage by copying such RTL pipeline register stage 346 for each data buss instance in which an interim pipeline register stage 370-1 is to be inserted, and another moved RTL pipelined register stage 346 may be instantiated as an interim pipeline stage by copying such RTL pipeline register stage 346 for each data buss instance in which an interim pipeline register stage 370-2 is to be inserted.

Effectively in this example, one RTL pipeline register stage 346 may be pushed from a top-level output to a 60-tap FIR output, and another RTL pipeline register stage 346 may be pushed from a top-level output to another 60-tap FIR output. Along those lines, a 180-tap FIR filter design may be reconfigured to be three 60-tap FIR filter designs cascade pipelined one-to-the other though without changing a number of pipeline register stages of such 180-tap FIR filter design.

Again, long filter chains are becoming more predominant in circuit designs associated with high performance. These long filter chains coupled with tight timing constraints are making placing and routing such long filter chains more problematic. However, by automatically dividing and pipelining long filter chains, namely longer than a threshold number of taps, into separate pipeline sections timing constraints may be deterministically met. Moreover, there may be more degrees of freedom with respect to locations where separate pipelines may be instantiated and concatenated to form a longer pipeline, such as for an FIR filter chain. Additionally, fan-out may be improved with more separate pipelines chained together than one long FIR filter chain.

In another implementation, a transposed FIR filter, namely where input data is broadcast across all taps generally simultaneously with coefficients ordered such as from right to left, or output to input, may be enhanced by restructuring or reconfiguring as described herein. In a transposed FIR filter, results may be fed into a pipelined adder chain within FIR generation blocks, generally acting as a data buffer to store previously calculated inner products of such adder chain. For purposes of clarity by way of example and not limitation, an FPGA device may be used having DSPs 206 where input data may be accessed by each tap of an FIR filter through A/B ports. Moreover, an adder chain may use dedicated "PCIN" and "PCOUT" hardware for cascaded connections to enhance performance.

Figures 1, 11:
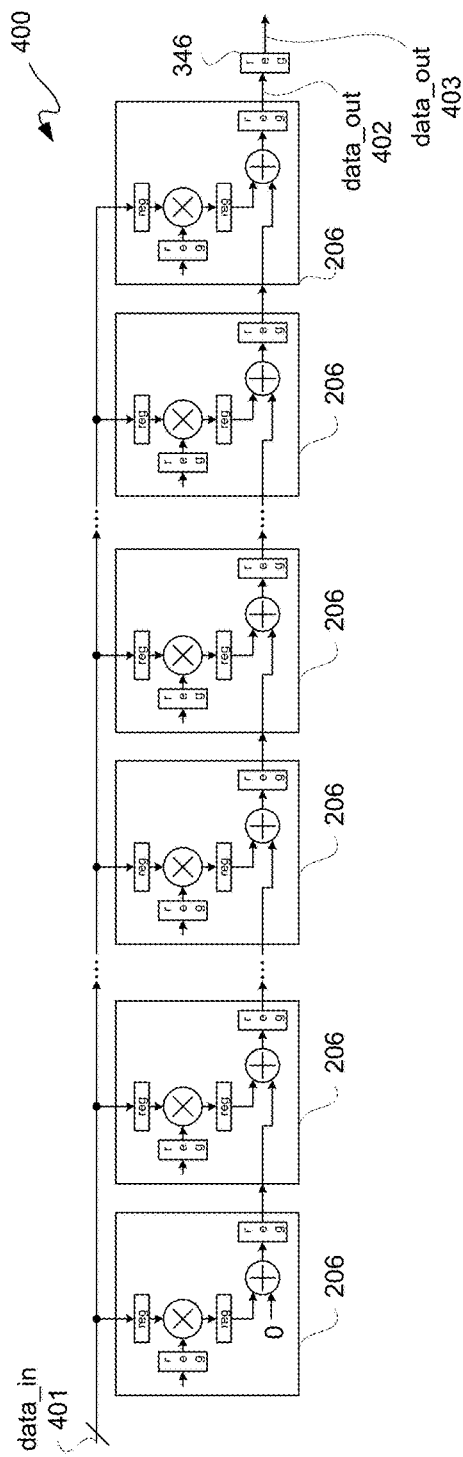
Figures 2, 11:
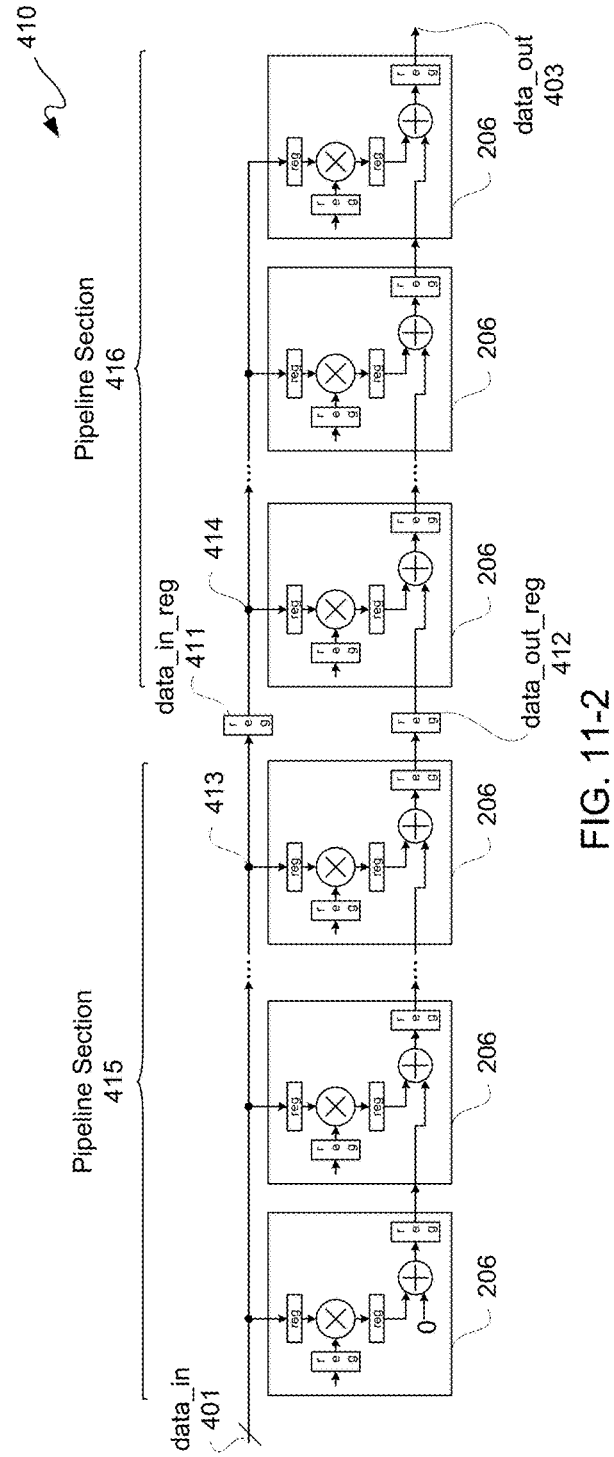

With the above example hardware platform borne in mind, FIG. 11-1 is a schematic diagram illustratively depicting an exemplary conventional transposed FIR filter ("transposed filter") 400. Transposed filter 400 is formed by a chain of DSPs 206 in a known manner for commonly receiving a data input signal 401. An output RTL pipeline register stage 346 is coupled to a data output 402 of a last DSP 206 is such cascaded chain of DSPs 206 for registering such data output to provide a data output 403.

FIG. 11-2 is a schematic diagram illustratively depicting an exemplary transposed FIR filter 410 after moving an output RTL pipeline register stage 346 of FIR filter 400 of FIG. 11-1. A data input pipelined register 411 may be located between two interim taps 413 and 414 corresponding to two interim DSPs 206 of transposed FIR filter 410. In an implementation, RTL pipeline register stages 411 and 412 may be positioned in the middle or approximately the middle a chain of DPSs 206 of transposed FIR filter 410. A data output pipelined register stage 412 may be located between a cascaded output data and a cascaded input data respectively of such interim DSPs 206. In an implementation, RTL pipeline register stages 411 and 412 may be positioned in the middle or approximately the middle a chain of DPSs 206 of transposed FIR filter 410.

Data output 403 of a last DSP 206 of transposed FIR filter 410 is the same as data output 403 of RTL pipeline register stage 346 of transposed FIR filter 400. However, by effectively breaking up transposed FIR filter 400 into two pipeline sections 415 and 416 in this example, though more than one RTL pipeline register 346 may be moved in another example, one or more of the above-described benefits may be obtained by placement of transposed FIR filter 410 over placement of transposed FIR filter 400.

For a systolic FIR filter, input data is fed into a cascade of registers acting as a data buffer. Each register delivers a sample to a multiplier for multiplication with a corresponding coefficient. In contrast to a transposed FIR filter, coefficient are aligned from left to right, or from input to output, with a first coefficient on a left side of a systolic FIR filter structure. Adder chains of a systolic FIR filter progressively combine partial products to form a final result. For purposes of clarity by way of example and not limitation, an FPGA device may be used having DSPs 206 where one input data chain accesses each tap through dedicated hardware cascade connections, such as from "ACIN" to "ACOUT" or "BCIN" to "BCOUT" to enhance performance, and another adder chain may use dedicated "PCIN" and "PCOUT" hardware for cascaded connections to enhance performance as in the transposed FIR filter example.

Figures 1, 12:
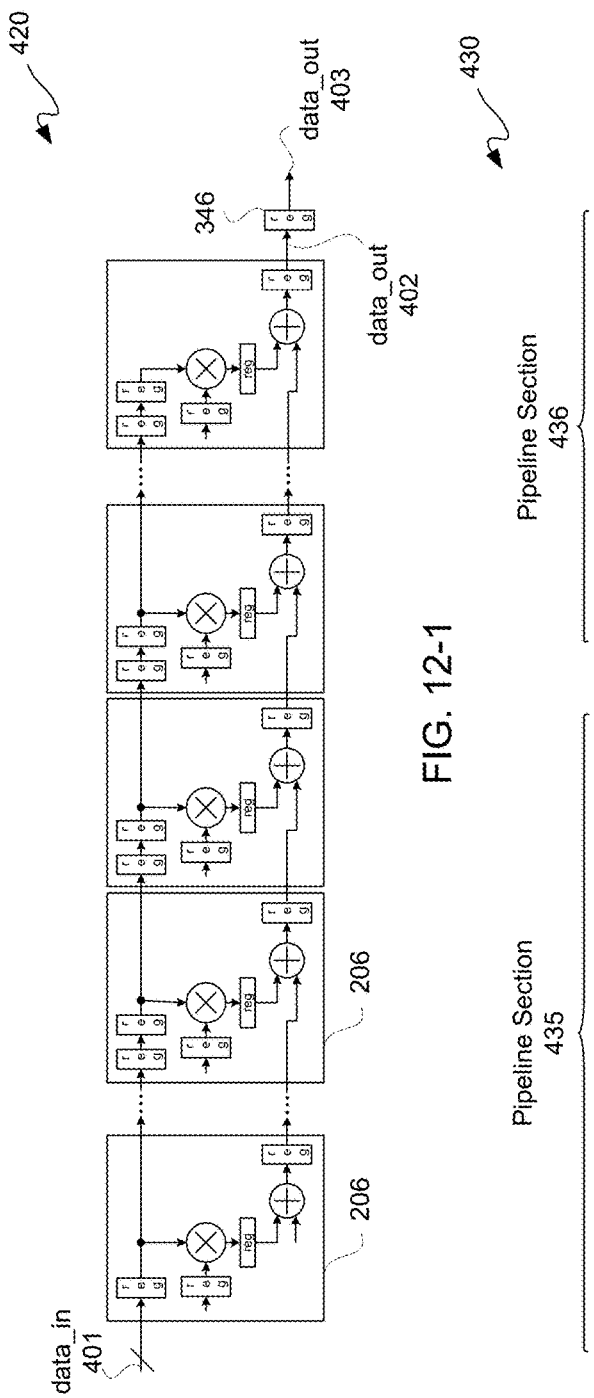
Figures 2, 12:
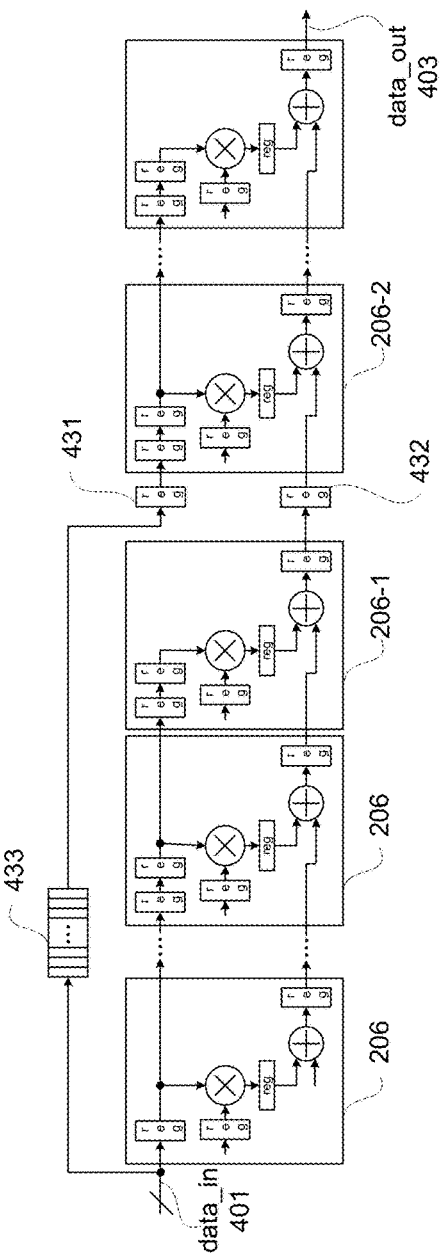

With the above example hardware platform borne in mind, FIG. 12-1 is a schematic diagram illustratively depicting an exemplary conventional systolic FIR filter ("systolic filter") 420. Systolic filter 420 is formed by a chain of DSPs 206 in a known manner for commonly receiving a data input signal 401. An output RTL pipeline register stage 346 is coupled to a data output 402 of a last DSP 206 is such cascaded chain of DSPs 206 for registering such data output to provide a data output 403.

FIG. 12-2 is a schematic diagram illustratively depicting an exemplary systolic FIR filter 430 after moving an output RTL pipeline register stage 346 of FIR filter 420 of FIG. 12-1. An RTL data input pipelined register stage 431 may be located between two interim taps corresponding to two interim DSPs 206-1 and 206-2 of systolic FIR filter 430. An RTL data output pipelined register stage 432 may be located between a cascaded output of an interim DSP 206-1 and a cascaded input of such a DSP 206-2. In an implementation, RTL pipeline register stages 431 and 432 may be positioned in the middle or approximately the middle a chain of DPSs 206 of systolic FIR filter 430.

Data output 403 of a last DSP 206 of systolic FIR filter 430 is the same as data output 403 of RTL pipeline register stage 346 of systolic FIR filter 420. However, by effectively breaking up systolic FIR filter 420 into two pipeline sections 435 and 436 in this example, though more than one RTL pipeline register 346 may be moved in another example, one or more of the above-described benefits may be obtained by placement of systolic FIR filter 430 over placement of systolic FIR filter 420. For moving an output RTL pipeline register stage 346 by replacing same with RTL pipeline registers stages 431 and 432, a data buffer 433 is added.

Data buffer 433 may be commonly coupled to an input node with a first DSP 206 in a chain of DSPs 206, where such data buffer 433 and a first DSP 206 in a chain of DSPs 206 each receive data input 401. Output buffered data from data buffer 433 may be provided as a data input to input RTL pipeline register stage 431, and output for RTL pipelined register stage 431 may be provided to interim DSP 206-2 on an upper input data chain of pipeline section 436. In other words, in order to reposition an output pipelined register stage to an interim pipelined register stage for a systolic FIR filter 430, a shift register data buffer 433, which may be implemented with registers of BRAM, of a depth of pipeline section 435 may be inserted between a data input node and a data input port of an insert interim RTL pipeline register stage 431. This allows both pipeline sections 435 and 436 to continue using DSP 206 cascaded A/B ports for enhanced performance.

Figure 13:
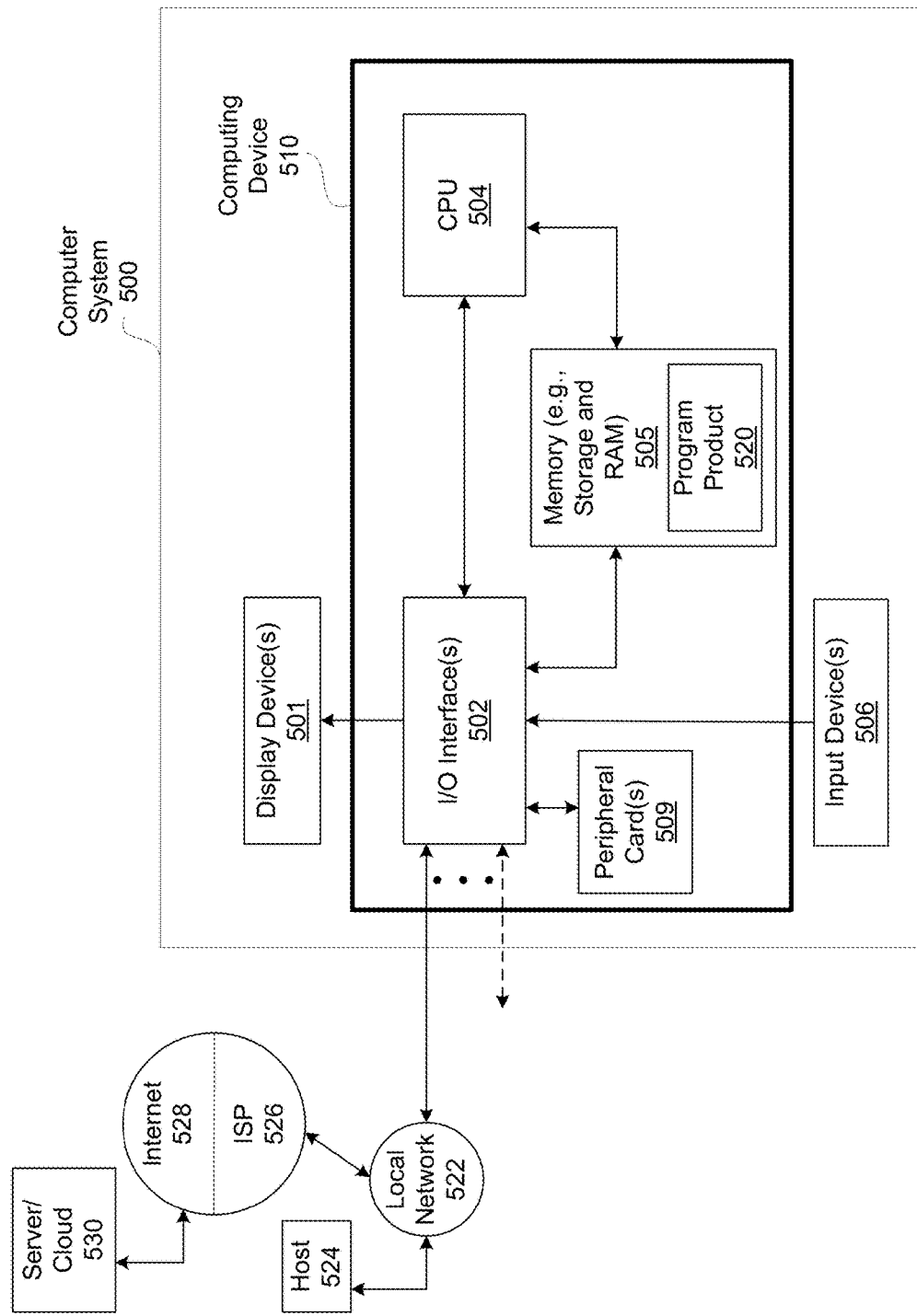
FIG. 13 is a block diagram illustratively depicting an exemplary computer system upon which one or more aspects described herein may be implemented.

FIG. 13 is a block diagram illustratively depicting an exemplary computer system 500 upon which one or more aspects described herein may be implemented. Computer system 500 may include a programmed computing device 510 coupled to one or more display devices 501, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 506, such as a keyboard and a cursor pointing device. Other known configurations of a computer system may be used. Computer system 500 by itself or networked with one or more other computer systems 500 may provide an information handling system.

Programmed computing device 510 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 510 includes a central processing unit ("CPU") 504, one or more memories and/or storage devices ("memory") 505, and one or more input/output ("I/O") interfaces ("I/O interface") 502. Programmed computing device 510 may optionally include a graphics processing unit ("GPU") 507 coupled to CPU 504 and one or more peripheral cards 509 coupled to I/O interface 502. Along those lines, programmed computing device 510 may include graphics memory 508 coupled to optional GPU 507.

CPU 504 may be a type of microprocessor known in the art, such as available from IBM, Intel, ARM, and Advanced Micro Devices for example. CPU 504 may include one or more processing cores. Support circuits (not shown) may include busses, cache, power supplies, clock circuits, data registers, and the like.

Memory 505 may be directly coupled to CPU 504 or coupled through I/O interface 502. At least a portion of an operating system may be disposed in memory 505. Memory 505 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 505 may include an SSD, which is coupled to I/O interface 502, such as through an SATA bus or other bus. Moreover, one or more SSDs may be used, such as for RAID or other multiple drive storage for example.

I/O interface 502 may include chip set chips, graphics processors, and/or daughter cards, among other known circuits. In this example, I/O interface 502 may be a Platform Controller Hub ("PCH"). I/O interface 502 may be coupled to a conventional keyboard, network, mouse, camera, microphone, display printer, and interface circuitry adapted to receive and transmit data, such as data files and the like.

Programmed computing device 510 may optionally include one or more peripheral cards 509. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 504 and I/O interface 502. Along those lines, GPU 507 may be incorporated into CPU 504 and/or may be of a separate peripheral card.

Programmed computing device 510 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to a programmed computing device 510. However, for purposes of clarity and not limitation, it shall be assumed that an SSD is housed in programmed computing device 510.

Memory 505 may store all or portions of one or more programs or data, including variables or intermediate information during execution of instructions by CPU 504, to implement processes in accordance with one or more embodiments hereof to provide program product 520. Program product 520 may be for implementing portions of process flows, as described herein, including without limitation placement of resources involving moving a pipeline register stage as described herein. Additionally, those skilled in the art will appreciate that one or more embodiments hereof may be implemented in hardware, software, or a combination of hardware and software. Such implementations may include a number of processors or processor cores independently executing various programs, dedicated hardware and/or programmable hardware.

Along those lines, implementations related to use of computing device 510 for implementing techniques described herein may be performed by computing device 510 in response to CPU 504 executing one or more sequences of one or more instructions contained in main memory of memory 505. Such instructions may be read into such main memory from another machine-readable medium, such as a storage device of memory 505. Execution of the sequences of instructions contained in main memory may cause CPU 504 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 520, as well as documents thereof, may define functions of embodiments hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 520. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an embodiment implemented using computer system 500, tangible machine-readable media are involved, for example, in providing instructions to CPU 504 for execution as part of programmed product 520. Thus, a programmed computing device 510 may include programmed product 520 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 504 for execution. For example, instructions may initially be carried on a magnetic disk or other storage media of a remote computer. The remote computer can load the instructions into its dynamic memory and send such instructions over a transmission media using a modem. A modem local to computer system 500 can receive such instructions on such transmission media and use an infra-red transmitter to convert such instructions to an infra-red signal. An infra-red detector can receive such instructions carried in such infra-red signal and appropriate circuitry can place such instructions on a bus of computing device 510 for writing into main memory, from which CPU 504 can retrieve and execute such instructions. Instructions received by main memory may optionally be stored on a storage device either before or after execution by CPU 504.

Computer system 500 may include a communication interface as part of I/O interface 502 coupled to a bus of computing device 510. Such a communication interface may provide a two-way data communication coupling to a network link connected to a local network 522. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 522 may provide data communication through one or more networks to other data devices. For example, a network link may provide a connection through local network 522 to a host computer 524 or to data equipment operated by an Internet Service Provider ("ISP") 526 or other Internet service provider. ISP 526 may in turn provide data communication services through a world-wide packet data communication network, the "Internet" 528. Local network 522 and the Internet 528 may both use electrical, electromagnetic or optical signals that carry analog and/or digital data streams. Data carrying signals through various networks, which carry data to and from computer system 500, are exemplary forms of carrier waves for transporting information.

Wireless circuitry of I/O interface 502 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 500 can send messages and receive data, including program code, through network(s) via a network link and communication interface of I/O interface 502. In the Internet example, a server 530 might transmit a requested code for an application program through Internet 528, ISP 526, local network 522 and I/O interface 502. Received code may be executed by processor 504 as it is received, and/or stored in a storage device, or other non-volatile storage, of memory 505 for later execution. In this manner, computer system 500 may obtain application code in the form of a carrier wave.

A software tool as described herein may automatically identify a filter structure, include any of the aforementioned filter structures and perform a transformation or reconfiguration. This transformation may be performed without having to have any additional input from a user of such software tool, as only conventional user input for a synthesizer may be used. Along those lines, while suggestions for addition of one or more additional pipeline structures may be output, a user need not add any additional pipeline structures for those instances where one or more identified pipelined register stages may be moved to meet timing parameters. Moreover, this reconfiguration is deterministic, as such transformation can be formally verified without any additional changes to a test or synthesis environment or to an input HDL circuit design.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for configuring a programmable device, comprising:
   generating a directed graph for a circuit design;
   identifying a cascaded chain in the directed graph with a timing violation;
   identifying available resources for placement of the cascaded chain;
   moving a pipeline register stage of the cascaded chain to remove the timing violation by adjusting negative slack;
   selecting a set of resources from the available resources for the placement of the cascaded chain to provide a multiple-column configuration having multiple-pipeline sections;
   transforming the circuit design to provide a netlist including the pipeline register stage; and
   providing a bitstream to the programmable device to instantiate the circuit design in the programmable circuitry of the programmable device.

2. The method according to claim 1, wherein the cascaded chain is a filter structure.

3. The method according to claim 2, wherein the step of identifying comprises:
   ranking cascaded chains identified in the directed graph having corresponding timing violations;
   selecting the cascaded chain having a current worst negative slack; and
   wherein the step of transforming comprises reconfiguring the filter structure with the set of resources to provide the netlist having the multiple-pipeline sections.

4. The method according to claim 3, further comprising placing the filter structure including the pipeline register stage using the selected set of resources.

5. The method according to claim 4, wherein the multiple-column configuration is disposed in at least two digital signal process block columns with at least one gap column between the at least two digital signal process block columns.

6. The method according to claim 3, wherein the step of selecting the set of resources comprises:
   calculating a current slack time for the filter structure with the pipeline register stage;
   comparing the current slack time to a previous slack time for the one filter structure; and
   storing the current slack time as the previous slack time responsive to the current slack time being closer to the zero slack target than the previous slack time.

7. The method according to claim 3, wherein the step of identifying the available resources comprises:
   obtaining a part type;
   determining a total number of programmatically configurable digital signal processing blocks within a single column and a number of columns of the programmatically configurable digital signal processing blocks for the part type; and
   wherein the total number of the programmatically configurable digital signal processing blocks in the single column does not include crossing an inter-die boundary.

8. The method according to claim 1, further comprising:
   searching for an input pipeline register stage or output pipeline register stage in the cascaded chain; and
   locating the input pipeline register stage or the output pipeline register stage.

9. The method according to claim 8, further comprising:
   counting the input pipeline register stage or the output pipeline register stage to obtain a number of movable pipeline register stages; and
   reconfiguring the cascaded chain with one or more of the movable pipeline register stages.

10. The method according to claim 9, wherein the reconfiguring comprises forming an interim pipeline register stage within the cascaded chain to provide a transposed finite impulse response filter.

11. The method according to claim 9, wherein the reconfiguring comprises:
    generating a data buffer coupled for receiving a data input received by the reconfigured cascaded chain; and
    generating an interim pipeline register stage within the reconfigured cascaded chain coupled to the data buffer to provide a systolic finite impulse response filter.

12. The method according to claim 11, wherein the reconfiguring comprises:
    generating a cascaded output-to-input pipelined register stage coupled between a first interim digital signal processing block and a second interim digital signal processing block; and
    generating a data input pipelined register stage coupled between the data buffer and the second interim digital signal processing block.

13. The method according to claim 3, wherein there is a one-to-one correspondence between columns of the multiple-column configuration and pipeline sections of the multiple-pipeline sections for the filter structure.

14. A method for configuring a programmable device, comprising:
    generating a directed graph for a circuit design;
    identifying a cascaded chain in the directed graph with a timing violation;
    identifying available resources for placement of the cascaded chain adding a pipeline register stage to the cascaded chain to remove the timing violation by adjusting negative slack;
    selecting a set of resources from the available resources for the placement of the cascaded chain to provide a multiple-column configuration having multiple-pipeline sections;
    transforming the circuit design to provide a netlist including the pipeline register stage; and
    providing a bitstream to the programmable device to instantiate the circuit design in the programmable circuitry of the programmable device.

15. The method according to claim 14, wherein the cascaded chain is a filter structure.

16. The method according to claim 15, wherein the step of identifying comprises:
    ranking cascaded chains identified in the directed graph having corresponding timing violations;

selecting the cascaded chain having a current worst negative slack; and wherein the step of transforming comprises reconfiguring the filter structure with the set of resources to provide the netlist having the multiple-pipeline sections.

17. The method according to claim 16, further comprising generating a report for the filter structure for the selected set of resources responsive to the netlist.

18. The method according to claim 17, wherein the multiple-column configuration is disposed in at least two digital signal process block columns with a gap column between the at least two digital signal process block columns.

19. The method according to claim 16, wherein there is a one-to-one correspondence between columns of the multiple-column configuration and pipeline sections of the multiple-pipeline sections for the filter structure.

20. A computer aided design program product for configuring a programmable device, the computer aided design program product comprising:
    a tangible computer-readable storage medium;
    a computer-readable program stored on the tangible computer-readable storage medium; and
    wherein the computer-readable program is capable of being processed by an information handling system for causing the information handling system to perform operations comprising:
    generating a directed graph for a circuit design;
    identifying a cascaded chain in the directed graph with a timing violation;
    identifying available resources for placement of the cascaded chain;
    moving a pipeline register stage of the cascaded chain to remove the timing violation by adjusting negative slack;
    selecting a set of resources from the available resources for the placement of the cascaded chain to provide a multiple-column configuration having multiple-pipeline sections;
    transforming the circuit design to provide a netlist including the pipeline register stage; and
    providing a bitstream to the programmable device to instantiate the circuit design in the programmable circuitry of the programmable device.

* * * * *